US008754161B2

(12) United States Patent
Terada et al.

(10) Patent No.: US 8,754,161 B2
(45) Date of Patent: Jun. 17, 2014

(54) COMPLEX-SHAPED FLUORORUBBER FORMED PRODUCT

(75) Inventors: Junpei Terada, Settsu (JP); Daisuke Ota, Settsu (JP); Masanori Kitaichi, Settsu (JP); Yutaka Ueta, Settsu (JP); Shigeru Morita, Settsu (JP); Kazuyoshi Kawasaki, Settsu (JP); Tatsuya Morikawa, Settsu (JP); Shoji Fukuoka, Settsu (JP)

(73) Assignee: Daikin Industries, Ltd., Osaka (JP)

(*) Notice: Subject to any disclaimer, the term of this patent is extended or adjusted under 35 U.S.C. 154(b) by 246 days.

(21) Appl. No.: 13/217,444

(22) Filed: Aug. 25, 2011

(65) Prior Publication Data

US 2012/0095151 A1 Apr. 19, 2012

Related U.S. Application Data

(60) Provisional application No. 61/376,997, filed on Aug. 25, 2010.

(51) Int. Cl.
*C08L 27/20* (2006.01)
*C08K 3/04* (2006.01)

(52) U.S. Cl.
USPC .......................... 524/495; 524/545

(58) Field of Classification Search
USPC ................................. 524/495, 545
See application file for complete search history.

(56) References Cited

U.S. PATENT DOCUMENTS

| 4,467,074 | A | 8/1984 | Oka et al. |
|---|---|---|---|
| 4,543,394 | A * | 9/1985 | Finlay et al. .................. 525/276 |
| 4,737,526 | A | 4/1988 | Mukaiyama et al. |
| 5,891,941 | A | 4/1999 | Tanaka et al. |
| 5,902,857 | A | 5/1999 | Wlassics et al. |
| 5,948,868 | A | 9/1999 | Albano et al. |
| 6,232,390 | B1 | 5/2001 | Ono et al. |
| 6,367,525 | B1 * | 4/2002 | Hiruma et al. ............. 152/152.1 |
| 6,543,785 | B1 | 4/2003 | Katayama et al. |
| 6,878,778 | B1 | 4/2005 | Kawasaki et al. |
| 7,368,506 | B2 | 5/2008 | Kanenari |
| 2005/0147828 | A1 | 7/2005 | Verschuere et al. |
| 2005/0256233 | A1 | 11/2005 | Ocho et al. |
| 2005/0282969 | A1 | 12/2005 | Comino et al. |
| 2006/0058450 | A1 | 3/2006 | Amemiya et al. |
| 2007/0219332 | A1 | 9/2007 | Washino et al. |
| 2008/0275184 | A1 | 11/2008 | Karato et al. |
| 2010/0069558 | A1 | 3/2010 | Stanga et al. |
| 2010/0209644 | A1 | 8/2010 | Abe et al. |
| 2011/0152487 | A1 | 6/2011 | Cook et al. |
| 2012/0067706 | A1 | 3/2012 | Terada et al. |
| 2012/0073696 | A1 | 3/2012 | Terada et al. |
| 2012/0077924 | A1 | 3/2012 | Ota et al. |
| 2012/0077925 | A1 | 3/2012 | Terada et al. |
| 2012/0077926 | A1 | 3/2012 | Ota et al. |
| 2012/0077927 | A1 | 3/2012 | Ota et al. |
| 2012/0077938 | A1 | 3/2012 | Ota et al. |
| 2012/0077939 | A1 | 3/2012 | Ota et al. |
| 2012/0095150 | A1 | 4/2012 | Ota et al. |
| 2012/0202938 | A1 | 8/2012 | Kawai et al. |

FOREIGN PATENT DOCUMENTS

| EP | 0168020 | A2 | 1/1986 |
|---|---|---|---|
| EP | 0 634 456 | A1 | 1/1995 |
| EP | 0 743 329 | A1 | 11/1996 |
| EP | 2 108 666 | A1 | 10/2009 |
| EP | 2 264 100 | A1 | 12/2010 |
| JP | 52-078951 | | 7/1977 |
| JP | 56-086948 | A | 7/1981 |
| JP | 58-037041 | A | 3/1983 |
| JP | 60-055050 | A | 3/1985 |
| JP | 61-057641 | A | 3/1986 |
| JP | 62-252435 | A | 11/1987 |
| JP | 63-286340 | A | 11/1988 |
| JP | 03-122153 | A | 5/1991 |
| JP | 03-217482 | A | 9/1991 |
| JP | 05-086236 | A | 4/1993 |
| JP | 06-001891 | A | 1/1994 |
| JP | 06-025500 | A | 2/1994 |
| JP | 07-233331 | A | 9/1995 |
| JP | 08-134269 | A | 5/1996 |
| JP | 09-124870 | A | 5/1997 |
| JP | 09-124871 | A | 5/1997 |
| JP | 09-188793 | A | 7/1997 |
| JP | 11-344165 | A | 12/1999 |
| JP | 2000-193152 | A | 7/2000 |
| JP | 2000-240730 | A | 9/2000 |
| JP | 2001-049048 | A | 2/2001 |
| JP | 2001-150595 | A | 6/2001 |
| JP | 2001-192482 | A | 7/2001 |

(Continued)

OTHER PUBLICATIONS

International Search Report mailed Oct. 25, 2011 for PCT/JP2011/069232.

Meng-Jiao Wang, et al.; "Carbon Blade"; Encyclopedia of Polymer Science and Technology; Copyright: John Wiley & Sons, Inc.; vol. 9; Oct. 15, 2003; pp. 52-91.

Extended European Search Report issued on Jan. 31, 2014 for EP Appln. No. 11820017.9.

Extended European Search Report issued on Feb. 3, 2014 for EP Appln. No. 11820014.6.

(Continued)

*Primary Examiner* — Robert D. Harlan
(74) *Attorney, Agent, or Firm* — Sughrue Mion, PLLC

(57) ABSTRACT

The present invention provides a complex-shaped fluororubber formed product having excellent demoldability in molding. The complex-shaped fluororubber formed product of the present invention comprises a cross-linked fluororubber layer obtainable by cross-linking a fluororubber composition containing a fluororubber (A) and a carbon black (B). The cross-linked fluororubber layer has a loss modulus E" of 400 kPa or higher and 6,000 kPa or lower determined by a dynamic viscoelasticity test (measurement temperature: 160° C., tensile strain: 1%, initial force: 157 cN, frequency: 10 Hz).

17 Claims, 2 Drawing Sheets

(56) References Cited

FOREIGN PATENT DOCUMENTS

| | | |
|---|---|---|
| JP | 2003-013041 A | 1/2003 |
| JP | 2003-083479 A | 3/2003 |
| JP | 2004-210830 A | 7/2004 |
| JP | 2005-003878 A | 1/2005 |
| JP | 2005-239835 A | 9/2005 |
| JP | 2005-315415 A | 11/2005 |
| JP | 2006-009010 A | 1/2006 |
| JP | 2006-022917 A | 1/2006 |
| JP | 2006-052399 A | 2/2006 |
| JP | 2007-040363 A | 2/2007 |
| JP | 2007-126539 A | 5/2007 |
| JP | 2007-269008 A | 10/2007 |
| JP | 2007-332216 A | 12/2007 |
| JP | 2008-127429 A | 6/2008 |
| JP | 2008-184496 A | 8/2008 |
| JP | 2009-024046 A | 2/2009 |
| JP | 2009-035578 A | 2/2009 |
| JP | 2009-102571 A | 5/2009 |
| JP | 2009-138053 A | 6/2009 |
| JP | 2009-298949 A | 12/2009 |
| WO | WO 03074625 A1 | 9/2003 |
| WO | WO 2006040944 A1 | 4/2006 |
| WO | WO 2008003634 A1 | 1/2008 |
| WO | WO 2008003635 A1 | 1/2008 |
| WO | WO 2008003636 A1 | 1/2008 |
| WO | 2008/078738 A1 | 7/2008 |
| WO | 2009/036131 A2 | 3/2009 |
| WO | 2009/119409 A1 | 10/2009 |

OTHER PUBLICATIONS

Extended European Search Report issued on Feb. 11, 2014 for EP Appln. No. 11820021.1.
Database CA (online); Chemical Abstracts Service; Kai, Yoshimasa et al.; "Fluorine-containing elastomeric copolymer compositions with good flowability and vulcanized rubber therefrom"; XP-002719217.

* cited by examiner

COMPLEX-SHAPED FLUORORUBBER FORMED PRODUCT

CROSS-REFERENCE TO RELATED APPLICATION

This application claims benefit under 35 U.S.C. §119(e) of U.S. Provisional Application No. 61/376,997 filed on Oct. 25, 2010, incorporated herein by reference in its entirety.

TECHNICAL FIELD

The present invention relates to a fluororubber formed product having a complex shape.

BACKGROUND ART

In general, complex-shaped fluororubber formed products, such as primer valve and bellows-structured flexible joints, expansion joints, boots, and grommets, are formed by heating and thereby cross-linking and molding a rubber composition with a mold corresponding to the complex shape. In releasing the product from the mold, however, cross-linked products are damaged in some cases due to the complex shape.

Fluororubbers are known to be excellent in chemical resistance, oil resistance, and heat resistance, and to have good resistance to compression set (for example, see Patent Documents 1 and 2). Common cross-linked products of fluororubber, however, are not as excellent in mechanical properties at high temperatures as those of non-fluororubber. Thus, the complex-shaped fluororubber formed products are disadvantageously likely to be damaged when they are produced.
Patent Document 1: JP 60-55050 A
Patent Document 2: JP 9-124871 A

SUMMARY OF THE INVENTION

Problems to be Solved by the Invention

An object of the present invention is to provide a complex-shaped fluororubber formed product having excellent demoldability in molding.

Means for Solving the Problems

The present inventors have performed diligent studies and focused on the loss modulus (E"). They have found that a formed product which is provided with a cross-linked fluororubber layer and which has a specific loss modulus is excellent in mechanical properties under high-temperature conditions exceeding 100° C., such as strength against heat, elongation at heat, and tear strength, and also found that such a formed product is less likely to be damaged upon demolding. Thereby, they have completed the present invention.

In other words, the present invention relates to a complex-shaped fluororubber formed product comprising a cross-linked fluororubber layer obtainable by cross-linking a fluororubber composition containing a fluororubber (A) and a carbon black (B), wherein the cross-linked fluororubber layer has a loss modulus E" of 400 kPa or higher and 6,000 kPa or lower determined by a dynamic viscoelasticity test under conditions of measurement temperature: 160° C., tensile strain: 1%, initial force: 157 cN, and frequency: 10 Hz.

The complex-shaped formed product is a formed product comprising a cross-linked fluororubber layer and a complex-shaped portion. The complex-shaped portion is, for example, a projection.

The complex-shaped formed product is preferably a formed product having one (or two or more) projection. The complex-shaped formed product is more preferably a formed product having one (or two or more) projection projecting in the perimeter direction of a cylinder.

Examples of the complex-shaped formed product include bellows-structured formed products and primer valves.

The bellows structure has a series of peak portions, a series of valley portions, or both series of peak portions and valley portions in the perimeter direction of a cylinder, for example. The peak or valley portions may have a circular wave shape or may have a triangle wave shape.

In view of excellent demoldability in molding, the complex-shaped formed product of the present invention is preferably a bellows-structured formed product. The primer valve is a pump for sending fuel to a carburetor (float chamber of carburetor), so that engine starting is easy. The primer valve has one peak portion in the perimeter direction of a cylinder, for example. The peak portion has a circular wave shape. One example of the shape of the primer valve is shown in FIG. 2. Generally, a primer valve 21 is set in between a discharge side (engine side) hose 22 and an inhalation side (fuel tank side) hose 23.

The complex-shaped formed product of the present invention can be used for primer valves for vehicles, primer valves for ships and vessels, primer valves for airplanes, primer valves for construction equipment, primer valves for agricultural machines or primer valves for mining machines. Especially, the complex-shaped formed product of the present invention is suitable for primer valves for ships and vessels.

Further, the cross-linked fluororubber layer preferably has a storage modulus E' of 1,500 kPa or higher and 20,000 kPa or lower determined by a dynamic viscoelasticity test under conditions of measurement temperature: 160° C., tensile strain: 1%, initial force: 157 cN, and frequency: 10 Hz.

The carbon black (B) which gives a loss modulus E" and a storage modulus E' to the cross-linked fluororubber layer is preferably a carbon black having a nitrogen adsorption specific surface area ($N_2SA$) of 5 to 180 $m^2/g$ and a dibutyl phthalate (DBP) oil absorption of 40 to 180 ml/100 g. This is because such a carbon black forms a carbon gel network reinforcing structure with fluororubber and thereby improves normal state at room temperature and mechanical properties at high temperatures.

Preferable examples of the fluororubber (A) include vinylidene fluoride copolymerized rubber, tetrafluoroethylene/perfluoro(alkyl vinyl ether) copolymerized rubber, and tetrafluoroethylene/propylene copolymerized rubber because of their good heat resistance (heat-aging resistance) and oil resistance.

The fluororubber composition may further contain a cross-linking agent (C) and/or a cross-linking aid (D).

The cross-linked fluororubber layer preferably has an elongation at break of 140 to 700%, a tensile strength at break of 3 to 20 MPa, and a tear strength of 3 to 30 kN/m each at 160° C. for improved demoldability of the complex-shaped formed product.

Further, the cross-linked fluororubber layer preferably has an elongation at break of 110 to 700%, a tensile strength at break of 2 to 20 MPa, and a tear strength of 3 to 30 kN/m each at 200° C. for improved demoldability of the complex-shaped formed product.

Effect of the Invention

The present invention provides a complex-shaped fluororubber formed product having excellent demoldability in molding.

MODES FOR CARRYING OUT THE INVENTION

Figure 1:
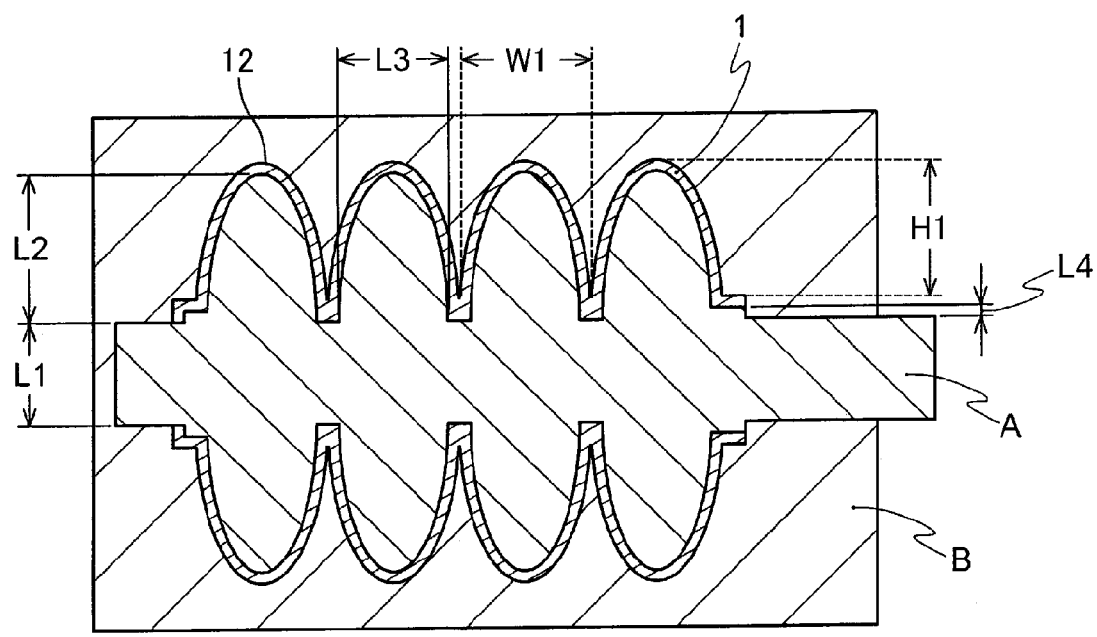
FIG. 1 is a schematic cross-sectional view of a mold used for evaluation of demoldability in the examples.
Figure 2:
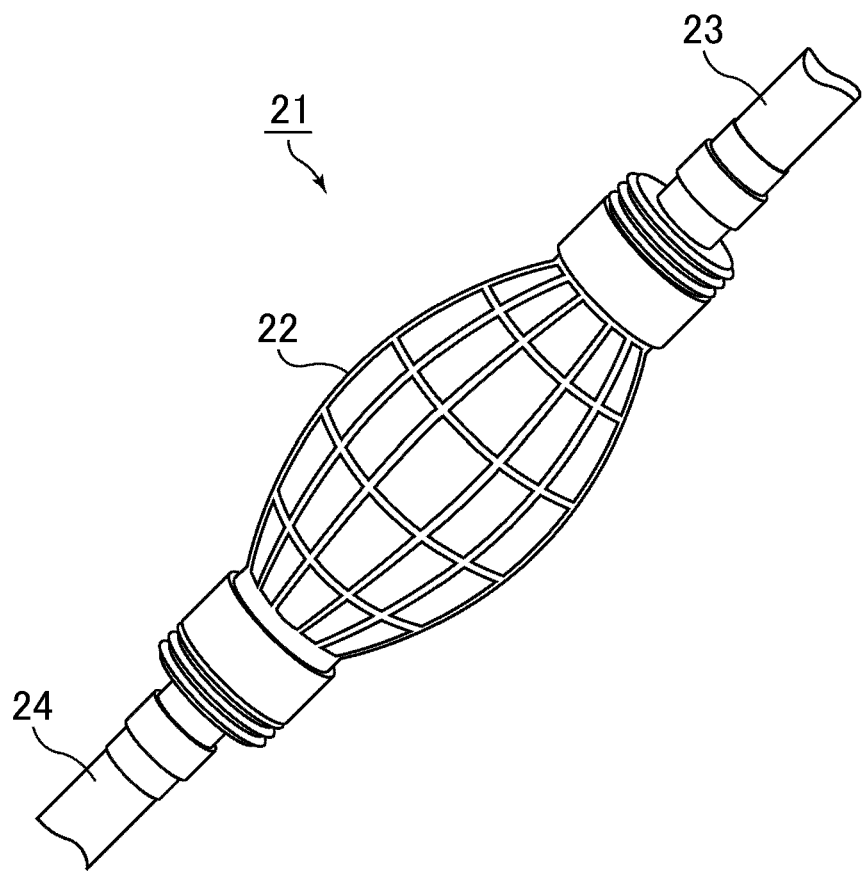
FIG. 2 is a schematic cross-sectional view of a example of shape of products for marine pump.

The present invention relates to a complex-shaped fluororubber formed product comprising a cross-linked fluororubber layer obtainable by cross-linking a fluororubber composition containing a fluororubber (A) and a carbon black (B), wherein the cross-linked fluororubber layer has a loss modulus E" of 400 kPa or higher and 6000 kPa or lower determined by a dynamic viscoelasticity test (measurement mode: tensile, chuck distance: 20 mm, measurement temperature: 160° C., tensile strain: 1%, initial force: 157 cN, frequency: 10 Hz).

The complex-shaped fluororubber formed product of the present invention is excellent in mechanical properties under high-temperature conditions exceeding 100° C., such as strength at high temperature, elongation at high temperature, and tear strength. Thus, the product is excellent in demoldability in molding even though it has a complex shape.

Respective requirements will be described hereinbelow.

The fluororubber (A) in the present invention preferably has a structural unit derived from at least one monomer selected from tetrafluoroethylene (TFE), vinylidene fluoride (VdF), and perfluoroethylenic unsaturated compounds (e.g. hexafluoropropylene (HFP) and perfluoro(alkyl vinyl ether) (PAVE)) represented by formula (1):

$$CF_2=CF-R_f^a \qquad (1)$$

wherein $R_f^a$ is $-CF_3$ or $-OR_f^b$ ($R_f^b$ is a C1-C5 perfluoroalkyl group).

In another aspect, the fluororubber is preferably a non-perfluoro fluororubber or a perfluoro fluororubber.

Examples of the non-perfluoro fluororubber include: vinylidene fluoride (VdF) fluororubber; tetrafluoroethylene (TFE)/propylene (Pr) fluororubber; tetrafluoroethylene (TFE)/propylene (Pr)/vinylidene fluoride (VdF) fluororubber; ethylene (Et)/hexafluoropropylene (HFP) fluororubber; ethylene (Et)/hexafluoropropylene (HFP)/vinylidene fluoride (VdF) fluororubber; ethylene (Et)/hexafluoropropylene (HFP)/tetrafluoroethylene (TFE) fluororubber; fluorosilicone fluororubber; and fluorophosphazene fluororubber. Each of these may be used alone, or any of these may be used in combination to the extent that they do not deteriorate the effects of the present invention. More suitable among these is at least one selected from the group consisting of VdF fluororubber, TFE/Pr rubber, and TFE/Pr/VdF rubber because of their good heat-aging resistance and oil resistance.

The VdF rubber preferably has 20 mol % or more and 90 mol % or less, and more preferably 40 mol % or more and 85 mol % or less, of a VdF repeating unit in the total moles of the VdF repeating unit and repeating units derived from other comonomers. The lower limit thereof is further preferably 45 mol % and particularly preferably 50 mol %, while the upper limit thereof is further preferably 80 mol %.

The comonomers in the VdF rubber are not particularly limited as long as they are copolymerizable with VdF. Examples thereof include fluoromonomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, and a fluorine-containing monomer represented by formula (2):

$$CH_2=CFR_f \qquad (2)$$

wherein $R_f$ is a C1-C12 linear or branched fluoroalkyl group; fluorine-free monomers such as ethylene (Et), propylene (Pr), and alkyl vinyl ethers; monomers giving a cross-linkable group (a curing site); and a reactive emulsifier. Each of these monomers and compounds may be used alone, or two or more of these may be used in combination.

The PAVE is preferably perfluoro(methyl vinyl ether) (PMVE) or perfluoro(propyl vinyl ether) (PPVE), and is particularly preferably PMVE.

The PAVE may be a perfluorovinyl ether represented by the formula:

$$CF_2=CFOCF_2OR_f^c$$

wherein $R_f^c$ is a C1-C6 linear or branched perfluoroalkyl group, a C5-C6 cyclic perfluoroalkyl group, or a C2-C6 linear or branched perfluorooxyalkyl group having 1 to 3 oxygen atoms. The PAVE is preferably $CF_2=CFOCF_2OCF_3$, $CF_2=CFOCF_2OCF_2CF_3$, or $CF_2=CFOCF_2OCF_2CF_2OCF_3$.

The fluorine-containing monomer (2) of formula (2) is preferably a monomer whose $R_f$ is a linear fluoroalkyl group, and more preferably a monomer whose $R_f$ is a linear perfluoroalkyl group. The carbon number of $R_f$ is preferably 1 to 6. Examples of the fluorine-containing monomer (2) of formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferable among these is 2,3,3,3-tetrafluoropropylene represented as $CH_2=CFCF_3$.

The VdF rubber is preferably at least one copolymer selected from the group consisting of a VdF/HFP copolymer, VdF/TFE/HFP copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/propylene (Pr) copolymer, VdF/ethylene (Et)/HFP copolymer, and copolymer of VdF/fluorine-containing monomer (2) of formula (2). Further, the rubber is more preferably one having TFE, HFP, and/or PAVE as comonomers other than VdF. Preferable among these is at least one copolymer selected from the group consisting of a VdF/HFP copolymer, VdF/TFE/HFP copolymer, copolymer of VdF/fluorine-containing monomer (2) of formula (2), VdF/PAVE copolymer, VdF/TFE/PAVE copolymer, VdF/HFP/PAVE copolymer, and VdF/HFP/TFE/PAVE copolymer. More preferable among these is at least one copolymer selected from the group consisting of a VdF/HFP copolymer, VdF/HFP/TFE copolymer, copolymer of VdF/fluorine-containing monomer (2) of formula (2), and VdF/PAVE copolymer. Particularly preferable among these is at least one copolymer selected from the group consisting of a VdF/HFP copolymer, copolymer of VdF/fluorine-containing monomer (2) of formula (2), and VdF/PAVE copolymer.

In the VdF/HFP copolymer, the composition of VdF/HFP is preferably (45 to 85)/(55 to 15) (mol %), more preferably (50 to 80)/(50 to 20) (mol %), and further preferably (60 to 80)/(40 to 20) (mol %).

In the VdF/TFE/HFP copolymer, the composition of VdF/TFE/HFP is preferably (30 to 80)/(4 to 35)/(10 to 35) (mol %).

In the VdF/PAVE copolymer, the composition of VdF/PAVE is preferably (65 to 90)/(35 to 10) (mol %).

In the VdF/TFE/PAVE copolymer, the composition of VdF/TFE/PAVE is preferably (40 to 80)/(3 to 40)/(15 to 35) (mol %).

In the VdF/HFP/PAVE copolymer, the composition of VdF/HFP/PAVE is preferably (65 to 90)/(3 to 25)/(3 to 25) (mol %).

In the VdF/HFP/TFE/PAVE copolymer, the composition of VdF/HFP/TFE/PAVE is preferably (40 to 90)/(0 to 25)/(0 to 40)/(3 to 35) (mol %), and more preferably (40 to 80)/(3 to 25)/(3 to 40)/(3 to 25) (mol %).

In the copolymer based on VdF/fluorine-containing monomer (2) of formula (2), the mol % ratio of VdF/fluorine-containing monomer (2) units is preferably 85/15 to 20/80 and the amount of monomer units other than the VdF and fluorine-containing monomer (2) units is preferably 0 to 50 mol % in all of the monomer units; the mol % ratio of the VdF/fluorine-containing monomer (2) units is more preferably 80/20 to 20/80. The mol % ratio of the VdF/fluorine-containing monomer (2) units is also preferably 85/15 to 50/50, and the amount of monomer units other than the VdF and fluorine-containing monomer (2) units is also preferably 1 to 50 mol % in all of the monomer units. The monomers other than the VdF and fluorine-containing monomer (2) units are preferably the monomers listed above as the comonomers for VdF, that is, TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ether, monomers giving a cross-linkable group, and a reactive emulsifier. Preferable among these are PMVE, CTFE, HFP, and TFE.

The TFE/propylene (Pr) fluororubber is a fluorine-containing copolymer containing 45 to 70 mol % of TFE and 55 to 30 mol % of propylene (Pr). In addition to these two components, the rubber may further contain 0 to 40 mol % of a specific third component (e.g. PAVE).

In the ethylene (Et)/HFP fluororubber (copolymer), the composition of Et/HFP is preferably (35 to 80)/(65 to 20) (mol %), and more preferably (40 to 75)/(60 to 25) (mol %).

In the Et/HFP/TFE fluororubber (copolymer), the composition of Et/HFP/TFE is preferably (35 to 75)/(25 to 50)/(0 to 15) (mol %), and more preferably (45 to 75)/(25 to 45)/(0 to 10) (mol %).

Examples of the perfluoro fluororubber include those including TFE/PAVE. The composition of TFE/PAVE is preferably (50 to 90)/(50 to 10) (mol %), more preferably (50 to 80)/(50 to 20) (mol %), and further preferably (55 to 75)/(45 to 25) (mol %).

Examples of the PAVE in this case include PMVE and PPVE. Each of these may be used alone, or any of these may be used in combination.

The fluororubber preferably has a number average molecular weight of 5,000 to 500,000, more preferably 10,000 to 500,000, and particularly preferably 20,000 to 500,000.

From the viewpoint of processability, the fluororubber (A) preferably has a Mooney viscosity at 100° C. of within a range of 20 to 200, and further preferably 30 to 180. The Mooney viscosity is measured in accordance with ASTM-D1646 and JIS K 6300.

The above-described non-perfluoro fluororubber and perfluoro fluororubber may be produced by a common method such as emulsion polymerization, suspension polymerization, or solution polymerization. In particular, a polymerization method using an iodine (bromine) compound, which is known as iodine (bromine) transfer polymerization, can provide a fluororubber having a narrow molecular weight distribution.

In order to provide a fluororubber composition having a low viscosity, for example, other species of fluororubbers may be blended with the fluororubber (A). Examples of other fluororubbers include low molecular weight liquid fluororubber (number average molecular weight: 1,000 or more), low molecular weight fluororubber having a number average molecular weight of about 10,000, and fluororubber having a number average molecular weight of about 100,000 to about 200,000.

The listed monomers in the above non-perfluoro fluororubber and perfluoro fluororubber are examples of the main monomers of the rubber, and the main monomers may be suitably copolymerized with monomers giving a cross-linkable group. The monomer giving a cross-linkable group may be any monomer which can provide a suitable cross-linkable group depending on a production method and cross-link system. Examples thereof include known polymerizable compounds and chain transfer agents having an iodine atom, bromine atom, carbon-carbon double bond, cyano group, carboxyl group, hydroxy group, amino group, ester group, and the like.

Examples of the monomer giving a preferable cross-linkable group include a compound represented by formula (3):

$$CY^1_2=CY^2R_f^2X^1 \quad (3)$$

wherein $Y^1$ and $Y^2$ each are a fluorine atom, hydrogen atom, or $—CH_3$; $R_f^2$ is a linear or branched fluoroalkylene group which may have one or more ethereal oxygen atom and which may have one or more aromatic rings, and in which part or all of the hydrogen atoms are replaced by fluorine atoms; $X^1$ is an iodine atom or a bromine atom.

Specific examples thereof include: iodine-containing monomers and bromine-containing monomers represented by formula (4):

$$CY^1_2=CY^2R_f^3CHR^1—X^1 \quad (4)$$

wherein $Y^1$, $Y^2$, and $X^1$ each are the same as defined above; $R_f^3$ is a linear or branched fluoroalkylene group which may have one or more ethereal oxygen atoms and in which part or all of the hydrogen atoms are replaced by fluorine atoms, in other words, $R_f^3$ is a linear or branched fluorine-containing alkylene group in which part or all of the hydrogen atoms are replaced by fluorine atoms, a linear or branched fluorine-containing oxyalkylene group in which part or all of the hydrogen atoms are replaced by fluorine atoms, or linear or branched fluorine-containing polyoxyalkylene group in which part or all of the hydrogen atoms are replaced by fluorine atoms; $R^1$ is a hydrogen atom or a methyl group; and iodine-containing monomers and bromine-containing monomers represented by formulas (5) to (22):

$$CY^4_2=CY^4(CF_2)_n—X^1 \quad (5)$$

wherein $Y^4$s may be the same as or different from each other, and each of these is a hydrogen atom or a fluorine atom; n is an integer of 1 to 8,

$$CF_2=CFCF_2R_f^4—X^1 \quad (6)$$

wherein
$R_f^4$ is $-(OCF_2-)_n$, $-(OCF(CF_3)-)_n$;
n is an integer of 0 to 5;

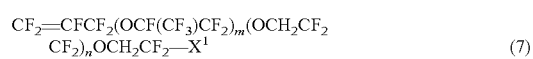

$$CF_2=CFCF_2(OCF(CF_3)CF_2)_m(OCH_2CF_2CF_2)_nOCH_2CF_2—X^1 \quad (7)$$

wherein m is an integer of 0 to 5; n is an integer of 0 to 5;

$$CF_2=CFCF_2(OCH_2CF_2CF_2)_m(OCF(CF_3)CF_2)_nOCF(CF_3)—X^1 \quad (8)$$

wherein m is an integer of 0 to 5; n is an integer of 0 to 5;

$$CF_2=CF(OCF_2CF(CF_3))_mO(CF_2)_n—X^1 \quad (9)$$

wherein m is an integer of 0 to 5; n is an integer of 1 to 8;

$$CF_2=CF(OCF_2CF(CF_3))_m—X^1 \quad (10)$$

wherein m is an integer of 1 to 5;

$$CF_2=CFOCF_2(CF(CF_3)OCF_2)_nCF(-X^1)CF_3 \quad (11)$$

wherein n is an integer of 1 to 4;

$$CF_2=CFO(CF_2)_nOCF(CF_3)—X^1 \quad (12)$$

wherein n is an integer of 2 to 5;

$$CF_2=CFO(CF_2)_n—(C_6H_4)—X^1 \quad (13)$$

wherein n is an integer of 1 to 6;

$$CF_2=CF(OCF_2CF(CF_3))_nOCF_2CF(CF_3)—X^1 \quad (14)$$

wherein n is an integer of 1 to 2;

$$CH_2=CFCF_2O(CF(CF_3)CF_2O)_nCF(CF_3)—X^1 \quad (15)$$

wherein n is an integer of 0 to 5;

$$CF_2=CFO(CF_2CF(CF_3)O)_m(CF_2)_n—X^1 \quad (16)$$

wherein m is an integer of 0 to 5; n is an integer of 1 to 3;

$$CH_2=CFCF_2OCF(CF_3)OCF(CF_3)—X^1 \quad (17)$$

$$CH_2=CFCF_2OCH_2CF_2—X^1 \quad (18)$$

$$CF_2=CFO(CF_2CF(CF_3)O)_mCF_2CF(CF_3)—X^1 \quad (19)$$

wherein m is an integer of 0 or greater;

$$CF_2=CFOCF(CF_3)CF_2O(CF_2)_n—X^1 \quad (20)$$

wherein n is an integer of 1 or greater;

$$CF_2=CFOCF_2OCF_2CF(CF_3)OCF_2—X^1 \quad (21)$$

$$CH_2=CH—(CF_2)_nX^1 \quad (22)$$

wherein n is an integer of 2 to 8;
in formulas (5) to (22), $X^1$ is the same as defined above. Each of these may be used alone, or any of these may be used in combination.

The iodine-containing monomer or the bromine-containing monomer represented by formula (4) is preferably an iodine-containing fluorinated vinyl ether represented by formula (23):

(23)

wherein m is an integer of 1 to 5; n is an integer of 0 to 3. More specific examples thereof include those represented as follows.

$$ICH_2CF_2CF_2OCF=CF_2, \quad I(CH_2CF_2CF_2O)_2CF=CF_2,$$

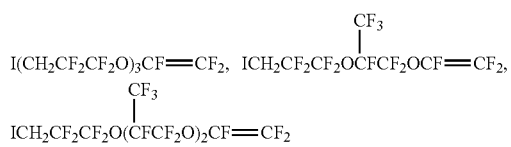

$$ICH_2CF_2CF_2O(CFCF_2O)_2CF=CF_2$$

Preferable among these is $ICH_2CF_2CF_2OCF=CF_2$.

More specifically, preferable examples of the iodine-containing monomer and the bromine-containing monomer represented by formula (5) include $ICF_2CF_2CF=CH_2$ and $I(CF_2CF_2)_2CF=CH_2$.

More specifically, preferable examples of the iodine-containing monomer and the bromine-containing monomer represented by formula (9) include $I(CF_2CF_2)_2OCF=CF_2$.

More specifically, preferable examples of the iodine-containing monomer and the bromine-containing monomer represented by formula (22) include $CH_2=CHCF_2CF_2I$ and $I(CF_2CF_2)_2CH=CH_2$.

Further, a bisolefin compound represented by formula:

$$R^2R^3C=CR^4—Z—CR^5=CR^6R^7$$

wherein $R^2$, $R^3$, $R^4$, $R^5$, $R^6$, and $R^7$ may be the same as or different from each other, and each of these is H or a C1-C5 alkyl group; Z is a C1-C18 linear or branched alkylene group or cycloalkylene group which may have an oxygen atom and which is preferably at least partially fluorinated, or a (per)fluoropolyoxyalkylene group, is also preferable as a monomer giving a cross-linkable group. The term "(per)fluoropolyoxyalkylene group" herein means a fluoropolyoxyalkylene group or a perfluoropolyoxyalkylene group.

Z is preferably a C4-C12 (per)fluoroalkylene group; $R^2$, $R^3$, $R^4$, $R^5$, $R^6$, and $R^7$ each are preferably a hydrogen atom.

In the case that Z is a (per)fluoropolyoxyalkylene group, it is preferably a (per)fluoropolyoxyalkylene group represented by formula:

$$-(Q)_p-CF_2O—(CF_2CF_2O)_m—(CF_2O)_n—CF_2-(Q)_p-$$

wherein Q is a C1-C10 alkylene group or a C2-C10 oxyalkylene group; p is 0 or 1; m and n are integers which give an m/n ratio of 0.2 to 5 and a molecular weight of the (per) fluoropolyoxyalkylene group of 500 to 10,000, preferably 1,000 to 4,000. In this formula, Q is preferably selected from —$CH_2OCH_2$— and —$CH_2O(CH_2CH_2O)_sCH_2$—
wherein s=1 to 3.

Preferable examples of the bisolefin include $CH_2=CH—(CF_2)_4—CH=CH_2$, $CH_2=CH—(CF_2)_6—CH=CH_2$, and those represented by formula:

$$CH_2=CH—Z^1—CH=CH_2$$

wherein $Z^1$ is —$CH_2OCH_2$—$CF_2O$—$(CF_2CF_2O)_m$—$(CF_2O)_n$—$CF_2$—$CH_2OCH_2$—, wherein m/n is 0.5.

Preferable among these is 3,3,4,4,5,5,6,6,7,7,8,8-dodecafluoro-1,9-decadiene represented as $CH_2=CH—(CF_2)_6—CH=CH_2$.

In the present invention, the carbon black (B) is not particularly limited as long as it is a carbon black providing the loss modulus E" in the above range and further preferably the storage modulus E' in the above range.

Examples of such a carbon black include furnace black, acetylene black, thermal black, channel black, and graphite. Specific examples thereof include SAF-HS($N_2$SA: 142 m²/g, DBP: 130 ml/100 g), SAF ($N_2$SA: 142 m²/g, DBP: 115 ml/100 g), N234 ($N_2$SA: 126 m²/g, DBP: 125 ml/100 g), ISAF ($N_2$SA: 119 m²/g, DBP: 114 ml/100 g), ISAF-LS ($N_2$SA: 106 m²/g, DBP: 75 ml/100 g), ISAF-HS($N_2$SA: 99 m²/g, DBP: 129 ml/100 g), N339 ($N_2$SA: 93 m²/g, DBP: 119 ml/100 g), HAF-LS ($N_2$SA: 84 m²/g, DBP: 75 ml/100 g), HAS-HS($N_2$SA: 82 m²/g, DBP: 126 ml/100 g), HAF ($N_2$SA: 79 m²/g, DBP: 101 ml/100 g), N351 ($N_2$SA: 74 m²/g, DBP: 127 ml/100 g), LI-HAF ($N_2$SA: 74 m²/g, DBP: 101 ml/100 g), MAF-HS($N_2$SA: 56 m²/g, DBP: 158 ml/100 g), MAF ($N_2$SA: 49 m²/g, DBP: 133 ml/100 g), FEF-HS($N_2$SA: 42 m²/g, DBP: 160 ml/100 g), FEF (N₂SA: 42 m²/g, DBP: 115 ml/100 g), SRF-HS(N₂SA: 32 m²/g, DBP: 140 ml/100 g), SRF-HS(N₂SA: 29 m²/g, DBP: 152 ml/100 g), GPF (N₂SA: 27 m²/g, DBP: 87 ml/100 g), SRF (N₂SA: 27 m²/g, DBP: 68 ml/100 g), SRF-LS (N₂SA: 23 m²/g, DBP: 51 ml/100 g), FT (N₂SA: 19 m²/g, DBP: 42 ml/100 g), and MT (N₂SA: 8 m²/g, DBP: 43 ml/100 g). Each of these carbon blacks may be used alone, or two or more of these may be used in combination.

Particularly preferable as the carbon black is a carbon black having a nitrogen adsorption specific surface area ($N_2SA$) of 5 to 180 m²/g and a dibutyl phthalate (DBP) oil absorption of 40 to 180 ml/100 g.

If the nitrogen adsorption specific surface area ($N_2SA$) is smaller than 5 m²/g, the mechanical properties of rubber tend to be poor in the case that the carbon black is mixed into the rubber. From this viewpoint, the nitrogen adsorption specific surface area ($N_2SA$) is preferably 10 m²/g or larger, more preferably 20 m²/g or larger, further preferably 30 m²/g or larger, particularly preferably 40 m²/g or larger. The upper limit thereof is preferably 180 m²/g for easy availability in general.

If the dibutyl phthalate (DBP) oil absorption is 40 ml/100 g or lower, the mechanical properties of rubber tend to be poor in the case that the carbon black is mixed into the rubber. From this viewpoint, the DBP oil absorption is preferably 50 ml/100 g or higher, further preferably 60 ml/100 g or higher, and particularly preferably 70 ml/100 g or higher. The upper limit thereof is preferably 175 ml/100 g, and further preferably 170 ml/100 g because of easy availability in general.

The amount of the carbon black (B) is preferably 5 to 50 parts by mass to 100 parts by mass of the fluororubber (A). Too large an amount of the carbon black (B) tends to cause poor mechanical properties of a cross-linked product and tends to make the cross-linked product too hard. In contrast, too small an amount of the carbon black (B) tends to cause poor mechanical properties. For good balance of physical properties, the amount thereof is preferably 6 parts by mass or more, more preferably 10 parts by mass or more, and further preferably 20 parts by mass or more, to 100 parts by mass of the fluororubber (A). For good balance of physical properties, the amount thereof is preferably 49 parts by mass or less and, in particular, more preferably 45 parts by mass or less.

In order to obtain the cross-linked fluororubber layer of the present invention, a fluororubber composition is suitably used that has a difference $\delta G'$ ($G'(1\%)-G'(100\%)$) between the shear modulus $G'(1\%)$ at 1% dynamic strain and the shear modulus $G'(100\%)$ at 100% dynamic strain of 120 kPa or higher and 3,000 kPa or lower determined by a dynamic viscoelasticity test (measurement temperature: 100° C., measurement frequency: 1 Hz) with a rubber process analyzer (RPA) before cross-linked.

The difference $\delta G'$ is used as a standard for evaluating the property of reinforcement of the rubber composition, and it is determined by a dynamic viscoelasticity test with a rubber process analyzer.

The fluororubber composition having a difference $\delta G'$ in the range of 120 kPa or higher and 3,000 kPa or lower is advantageous for good normal state at room temperature, mechanical properties at high temperatures, and the like.

The difference $\delta G'$ is preferably 150 kPa or higher, and further preferably 160 kPa or higher, for good normal state at room temperature, mechanical properties at high temperatures, and the like. In contrast, it is preferably 2,800 kPa or lower, and further preferably 2,500 kPa or lower, for good normal state at room temperature, mechanical properties at high temperatures, and the like.

The fluororubber composition having a difference $\delta G'$ of 120 kPa or higher and 3,000 kPa or lower may be prepared using a mixer or a roll mixer, for example.

More specifically, the following methods may be adopted; the method is not limited to these methods.

(1) A method in which predetermined amounts of a fluororubber (A) and a carbon black (B), and if necessary the below-mentioned organic amine compound and/or acid acceptor, are charged into an internal mixer, and then mixed at an average shear rate of a rotor of 50 to 1,000 (1/second), preferably 100 to 1,000 (1/second), and further preferably 200 to 1,000 (1/second) so that the highest mixing temperature Tm is 80° C. to 220° C. (preferably 120° C. to 200° C.) (in other words, mixing is preferably carried out under the condition that a mixed product has a highest temperature Tm of 80° C. to 220° C. while being mixed and being discharged. The same applies below). Examples of the internal mixer include a pressurizing kneader, Banbury mixer, single screw mixer, and twin screw mixer.

(2) A method in which predetermined amounts of a fluororubber (A) and a carbon black (B), and if necessary the below-mentioned organic amine compound and/or acid acceptor, are charged into a roll mixer, and then mixed under the conditions that the average shear rate of a rotor is 50 (1/second) or higher and the highest mixing temperature Tm is to be 80° C. to 220° C. (preferably, 120° C. to 200° C.)

The fluororubber compositions obtained by the above methods (1) and (2) are free from components such as a cross-linking agent (and/or a cross-linking aid (D)) and a cross-linking accelerator. Further, the mixing of the methods (1) and (2) may be performed multiple times. In the case of performing the mixing multiple times, the mixing conditions of the second and further subsequent mixing may be the same as those in the methods (1) and (2) except that the highest temperature Tm upon mixing is 140° C. or lower.

One example of the method for preparing a cross-linkable fluororubber composition used in the present invention is a method in which the fluororubber composition obtained in the method (1) or (2), or obtained by repeating the method (1) or (2) multiple times, is further blend-mixed with a cross-linking agent (C) (and/or a cross-linking aid (D)) and a cross-linking accelerator.

The cross-linking agent (C) (and/or the cross-linking aid (D)) and the cross-linking accelerator may be blend-mixed at the same time, or the cross-linking accelerator may be first blend-mixed and then the cross-linking agent (C) (and/or the cross-linking aid (D)) may be blend-mixed. The conditions for mixing the cross-linking agent (C) (and/or the cross-linking aid (D)) and the cross-linking accelerator may be the same as those in the methods (1) and (2) except that the highest mixing temperature Tm is 130° C. or lower.

Another example of the method for preparing a cross-linkable fluororubber composition is a method in which predetermined amounts of a fluororubber (A), carbon black (B), cross-linking agent (C) (and/or cross-linking aid (D)), and cross-linking accelerator are charged into a roll mixer in an appropriate order, and then mixed under the conditions that the average shear rate of a rotor is 50 (1/second) or higher and the highest mixing temperature Tm is 130° C. or lower.

In the case of the polyol cross-link system, the fluororubber (A), the cross-linking agent (C), and a cross-linking accelerator may be preliminarily mixed to prepare a uniform dispersion, and this uniform dispersion may be used. For example, the fluororubber (A), a polyol cross-linking agent, and a cross-linking accelerator are first mixed, and then a carbon black and the below-mentioned organic amine compound are mixed thereinto. The mixture is mixed at the highest temperature Tm upon mixing of 80 to 220° C. Finally, an acid acceptor is mixed therewith at the highest temperature Tm upon mixing is 130° C. or lower. Upon mixing, a more preferable is one in which mixing is performed at an average shear rate of 50 (1/second) or higher.

The range of the difference δG' is preferably satisfied in the fluororubber composition before mixed with a cross-linking agent (C) and/or a cross-linking aid (D), and a cross-linking accelerator. Further, the difference δG' is also preferably within the above range even in the fluororubber composition containing a cross-linking agent (C) and/or a cross-linking aid (D), and a cross-linking accelerator.

In order to obtain a fluororubber layer having the aforementioned specific loss modulus E" and storage modulus E', the average shear rate is preferably 50 (1/second) or higher. An average shear rate of 50 (1/second) or higher provides desired normal state at room temperature and mechanical properties at high temperatures.

The average shear rate (1/second) is calculated by the following formula.

$$\text{Average shear rate (1/second)} = (\pi \times D \times R)/(60 \text{ (seconds)} \times c)$$

wherein
D: rotor diameter or roll diameter (cm)
R: rotation rate (rpm)
c: tip clearance (cm, gap distance between rotor and casing or gap distance between rolls)

The cross-linking agent (C) and/or the cross-linking aid (D), and the cross-linking accelerator may be appropriately selected depending on the cross-link system, the type of the fluororubber (A) to be cross-linked (e.g. composition of copolymerization, presence of a cross-linkable group and the type thereof), the specific applications and the modes of a complex-shaped formed product to be obtained, the mixing conditions, and the like.

In the present invention, the cross-linking aid (D) is a compound which triggers a cross-linking reaction in the below-mentioned triazine cross-link system, or a compound which accelerates a cross-linking reaction in the oxazole cross-link system, thiazole cross-link system, or imidazole cross-link system.

Examples of the cross-link system include a peroxide cross-link system, polyol cross-link system, polyamine cross-link system, oxazole cross-link system, thiazole cross-link system, imidazole cross-link system, and triazine cross-link system.

(Peroxide Cross-Link System)

In the case that cross-linking is performed by the peroxide cross-link system, the cross-linking site has a carbon-carbon bond; thus, the system is superior in chemical resistance and steam resistance compared with the polyol cross-link system in which the cross-linking site has a carbon-oxygen bond and the polyamine cross-link system in which the cross-linking site has a carbon-nitrogen double bond.

The cross-linking agent (C) is preferably a cross-linking agent of the peroxide cross-link system. The cross-linking agent of the peroxide cross-link system may be any peroxide capable of easily generating a peroxy radical in the presence of heat or a redox system. Specific examples thereof include organic peroxides such as 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, α,α-bis(t-butylperoxy)-m-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxybenzoate, t-butylperoxy maleic acid, and t-butylperoxyisopropyl carbonate. Preferable among these is 2,5-dimethyl-2,5-di(t-butylperoxy)hexane or 2,5-dimethyl-2,5-di(t-butylperoxy)-hexyne-3.

Further, in the peroxide cross-link system, it is preferable to use a cross-linking accelerator, in general. Examples of the cross-linking accelerator for peroxide cross-linking agents, especially organoperoxide cross-linking agents, include triallyl cyanurate, triallyl isocyanurate (TAIC), triacryl formal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinyl methyltrisiloxane, tri(5-norbornene-2-methylene)cyanurate, and triallyl phosphite. Preferable among these is triallyl isocyanurate (TAIC) from the viewpoints of its cross-linkability and physical properties of cross-linked products.

A perfluoro fluororubber and a non-perfluoro fluororubber having at least a TFE unit, a VdF unit, or a fluorine-containing monomer unit of formula (1) may be suitably used as the fluororubber (A) for the peroxide cross-link system. Particularly preferable is at least one rubber selected from VdF rubbers and TFE/Pr rubbers.

From the viewpoint of cross-linkability, the fluororubber (A) suitable for the peroxide cross-link system is preferably a fluororubber having an iodine atom and/or a bromine atom as a cross-linking site. For good balance of physical properties, the amount of an iodine atom and/or a bromine atom is preferably 0.001 to 10% by weight, further preferably 0.01 to 5% by weight, and particularly preferably 0.1 to 3% by weight.

The amount of the peroxide cross-linking agent is preferably 0.01 to 10 parts by mass, more preferably 0.1 to 9 parts by mass, and particularly preferably 0.2 to 8 parts by mass, to 100 parts by mass of the fluororubber (A). If the amount of the peroxide cross-linking agent is less than 0.01 parts by mass, cross-linking of the fluororubber (A) tends to insufficiently proceed. In contrast, if the amount thereof is more than 10 parts by mass, balance of physical properties tends to be poor.

Further, the amount of the cross-linking accelerator is generally 0.01 to 10 parts by mass, and preferably 0.1 to 9 parts by mass, relative to 100 parts by mass of the fluororubber (A). If the amount of the cross-linking accelerator is less than 0.01 parts by mass, cross-linking tends to take too long a time which may be impractical. In contrast, if the amount thereof is more than 10 parts by mass, cross-linking duration tends to be too short, as well as cause poor balance of physical properties.

(Polyol Cross-Link System)

In the case of cross-linking by the polyol cross-link system, the cross-linking site has a carbon-oxygen bond, compression set is low, and formability is excellent. Therefore, this cross-link system is preferable.

The polyol cross-linking agent may be a compound conventionally known as a cross-linking agent for fluororubber. Suitably used is a polyhydroxy compound, especially a polyhydroxyaromatic compound, for example, because of its excellent heat resistance.

The polyhydroxyaromatic compound is not particularly limited. Examples thereof include 2,2-bis(4-hydroxyphenyl) propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valerate, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxyaromatic compounds may be alkaline metal salts or alkaline earth metal salts; in the case of coagulating copolymers using an acid, it is preferable not to use the metal salts.

Of these compounds, polyhydroxy compounds are preferable because of a low compression set of a formed product to be obtained and excellent formability; polyhydroxyaromatic compounds are more preferable because of excellent heat resistance; and bisphenol AF is further preferable.

Further, in the polyol cross-link system, it is preferable to use a cross-linking accelerator, in general. A cross-linking accelerator accelerates generation of double bonds in molecules in defluorination reaction of the main chain of the fluororubber and addition of the polyhydroxy compound to the generated double bonds, so that the cross-linking reaction is accelerated.

A generally used cross-linking accelerator for the polyol cross-link system is an onium compound. The onium compound is not particularly limited. Examples thereof include ammonium compounds such as quaternary ammonium salts, phosphonium compounds such as quaternary phosphonium salts, oxonium compounds, sulfonium compounds, cyclic amines, and monofunctional amine compounds. Preferable among these are quaternary ammonium salts and quaternary phosphonium salts.

The quaternary ammonium salts are not particularly limited. Examples thereof include 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7-undecenium methylsulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter referred to as DBU-B), 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. Preferable among these is DBU-B because of its cross-linkability and physical properties of a cross-linked product.

The quaternary phosphonium salts are not particularly limited. Examples thereof include tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. Preferable among these is benzyltriphenylphosphonium chloride (BTPPC) because of its cross-linkability and physical properties of a cross-linked product.

In addition, a molten salt of a quaternary ammonium salt or a quaternary phosphonium salt and bisphenol AF, or a chlorine-free cross-linking accelerator disclosed in JP 11-147891 A may be used as a cross-linking accelerator.

Any perfluoro fluororubber or non-perfluoro fluororubber having at least a TFE unit, a VdF unit, or a fluorine-containing monomer unit of formula (1) may be suitably used as the fluororubber (A) for the polyol cross-link system. Particularly preferable is at least one rubber selected from a VdF rubbers and TFE/Pr rubbers.

The amount of the polyol cross-linking agent is preferably 0.01 to 10 parts by mass, and more preferably 0.1 to 7 parts by mass, relative to 100 parts by mass of the fluororubber (A). If the amount of the polyol cross-linking agent is less than 0.01 parts by mass, the fluororubber (A) tends to be insufficiently cross-linked, while if the amount thereof is more than 10 parts by mass, the balance of physical properties tends to be poor.

The amount of the cross-linking accelerator is preferably 0.01 to 8 parts by mass, and more preferably 0.02 to 5 parts by mass, to 100 parts by mass of the fluororubber (A). If the amount of the cross-linking accelerator is less than 0.01 parts by mass, cross-linking of the fluororubber (A) tends to insufficiently proceed. In contrast, if the amount thereof is more than 8 parts by mass, the balance of physical properties tends to be poor.

(Polyamine Cross-Link System)

In the case of polyamine cross-linking, the cross-linking site has a carbon-nitrogen double bond and dynamic mechanical properties are excellent. However, the compression set tends to be high in comparison with the case of cross-linking using a polyol cross-linking or peroxide cross-linking agent.

Examples of the polyamine cross-linking agent include polyamine compounds such as hexamethylenediamine carbamate, N,N'-dicinnamylidene-1,6-hexamethylenediamine, and 4,4'-bis(aminocyclohexyl)methane carbamate. Preferable among these is N,N'-dicinnamylidene-1,6-hexamethylenediamine.

Any perfluoro fluororubber or non-perfluoro fluororubber at least having a TFE unit, a VdF unit, or a fluorine-containing monomer unit of formula (1) may be used as the fluororubber (A) suitable for the polyamine cross-link system. In particular, a VdF rubber or a TFE/Pr rubber is preferable.

The amount of the polyamine cross-linking agent is preferably 0.01 to 10 parts by mass, and more preferably 0.2 to 7 parts by mass, to 100 parts by mass of the fluororubber (A). If the amount of the polyamine cross-linking agent is less than 0.01 parts by mass, cross-linking of the fluororubber (A) tends to insufficiently proceed. In contrast, if the amount thereof is more than 10 parts by mass, the balance of physical properties tends to be poor.

(Oxazole Cross-Link System, Thiazole Cross-Link System, and Imidazole Cross-Link System)

The oxazole cross-link system, thiazole cross-link system, and imidazole cross-link system are cross-link systems with a low compression set and excellent heat resistance.

Examples of the cross-linking agent used in the oxazole cross-link system, thiazole cross-link system, and imidazole cross-link system include:

compounds having at least two cross-linkable reaction groups represented by formula (24):

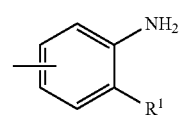

(24)

wherein R¹s may be the same as or different from each other and each are —NH₂, —NHR², —OH, or —SH; R₂ is a fluorine atom or a monovalent organic group;

compounds represented by formula (25):

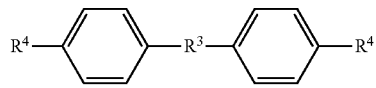

(25)

wherein R3 is —SO2-, —O—, —CO—, a C1-C6 alkylene group, a C1-C10 perfluoroalkylene group, or a single bond; and

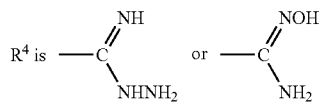

compounds represented by formula (26):

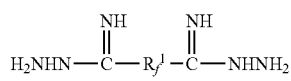

(26)

wherein $R_f^1$ is a C1-C10 perfluoroalkylene group; and
compounds represented by formula (27):

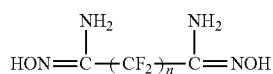

(27)

wherein n is an integer of 1 to 10.

Specific examples of the cross-linking agent include:
compounds each of which has two cross-linkable reaction groups represented by formula (24) and each of which is represented by formula (28):

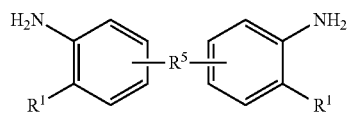

(28)

wherein R¹ is as defined above; R⁵ is —SO₂—, —O—, —CO—, a C1-C6 alkylene group, a C1-C10 perfluoroalkylene group, a single free bond, or a group represented by formula:

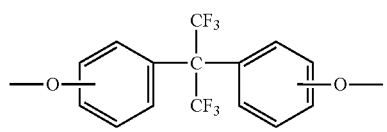

2,2-bis(3-amino-4-hydroxyphenyl)hexafluoropropane, 2,2-bis(3-amino-4-mercaptophenyl)hexafluoropropane, 2,2-bis(3,4-diaminophenyl)hexafluoropropane, and compounds represented by formula (29):

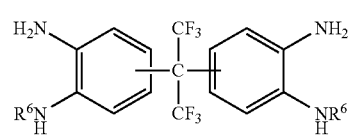

(29)

wherein R⁶s are the same as or different from each other and each of these is a C1-C10 alkyl group; a C1-C10 alkyl group having a fluorine atom; a phenyl group; a benzyl group; or a phenyl group or a benzyl group in which 1 to 5 hydrogen atoms are replaced by a fluorine atom and/or —CF₃.

Non-limitative specific examples thereof include bisaminophenol cross-linking agents such as 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

Further preferable among the above cross-linking agents are 2,2-bis(3-amino-4-hydroxyphenyl)hexafluoropropane (OH-AF), 2,2-bis[3-amino-4-(N-phenylamino)phenyl]hexafluoropropane(Nph-AF), and 2,2-bis(3,4-diaminophenyl)hexafluoropropane(TA-AF) because of excellent heat resistance and particularly good cross-linking reactivity.

In these oxazole cross-link system, thiazole cross-link system, and imidazole cross-link system, a cross-linking aid (D) may be used in combination for greatly increased cross-linking rate.

Examples of the cross-linking aid (D) combination-used in the oxazole cross-link system, thiazole cross-link system, and imidazole cross-link system include (D1) compounds generating ammonia at 40° C. to 330° C. and (D2) particulate inorganic nitride.

(D1) Compounds Generating Ammonia at 40° C. to 330° C. (Ammonia-Generating Compounds)

The ammonia-generating compound (D1) leads to curing as ammonia generated at cross-linking reaction temperature (40° C. to 330° C.) causes cross-linking, and also accelerates curing by a cross-linking agent. There are compounds which react with a slight amount of water to generate ammonia.

Preferable examples of the ammonia-generating compound (D1) include urea or derivatives thereof or ammonium salts. More preferable examples of the ammonia-generating compound (D1) include urea or ammonium salts.

The derivatives of urea includes urea, as well as urea derivatives such as biurea, thiourea, urea hydrochlorides, and biuret.

Examples of the organic ammonium salt include compounds disclosed in JP 9-111081 A, WO 00/09603, and WO 98/23675, such as ammonium salts of polyfluorocarboxylic acids e.g. ammonium perfluorohexanoate and ammonium perfluorooctanoate; ammonium salts of polyfluorosulfonic acids e.g. ammonium perfluorohexanesulfonate and ammonium perfluorooctanesulfonate; ammonium salts of polyfluoroalkyl group-containing phosphoric acids and phosphoric acids e.g. ammonium perfluorohexanephosphate and ammonium perfluorooctanephosphate; and ammonium salts of non-fluorocarboxylic acids and sulfonic acids e.g. ammonium benzoate, ammonium adipate, and ammonium phthalate. Preferable among these are ammonium salts of fluorocarboxylic acids, sulfonic acids, and phosphoric acids from the viewpoint of dispersibility; from the viewpoint of low cost, preferable among these are ammonium salts of non-fluorocarboxylic acids, sulfonic acids, and phosphoric acids.

Examples of the inorganic ammonium salt include compounds disclosed in JP 9-111081 A, such as ammonium sulfate, ammonium carbonate, ammonium nitrate, and ammonium phosphate. Preferable among these is ammonium phosphate in consideration of cross-linking characteristics.

In addition, acetaldehyde ammonia, hexamethylenetetramine, formamidine, formamidine hydrochloride, formamidine acetate, t-butylcarbamate, benzylcarbamate, $HCF_2CF_2CH(CH_3)OCONH_2$, and phthalamide can be used.

Each of these ammonia-generating compounds (D1) may be used alone, or two or more of these may be used in combination.

(D2) Particulate Inorganic Nitride

The particulate inorganic nitride (D2) is not particularly limited. Examples thereof include silicon nitride ($Si_3N_4$), lithium nitride, titanium nitride, aluminum nitride, boron nitride, vanadium nitride, and zirconium nitride. Preferable among these is particulate silicon nitride because nano-size fine particles can be provided. Each of these particulate nitrides may be used alone, or two or more of these may be used in combination.

The particle diameter of the particulate inorganic nitride (D2) is not particularly limited; it is preferably 1000 nm or smaller, more preferably 300 nm or smaller, and further preferably 100 nm or smaller. The lower limit thereof is not particularly limited.

These particulate inorganic nitrides (D2) may be used in combination with an ammonia-generating compound (D1).

These oxazole cross-link system, thiazole cross-link system, and imidazole cross-link system are used for the following VdF rubber having a specific cross-linkable group and TFE/Pr rubber having a specific cross-linkable group.

(Vdf Rubber Having Specific Cross-Linkable Group)

The specific VdF rubber is a VdF rubber which is a copolymer of VdF, at least one fluoroolefin selected from TFE, HFP, and fluoro(vinylether), and a monomer having a cyano group, carboxyl group, or alkoxycarbonyl group. The fluoroolefin is preferably a perfluoroolefin.

Here, it is important that the copolymerization ratio of the VdF is higher than 20 mol % in order to reduce weakness at low temperatures.

With respect to the fluoro(vinylether), one of the following compounds may be used or two or more of these may be used in combination. The compounds are those represented by formula (30):

$$CF_2=CFO(CF_2CFY^2O)_p-(CF_2CF_2CF_2O)_q-R_f^5 \quad (30)$$

wherein $Y^2$ is a fluorine atom or $-CF_3$; $R_f^5$ is a C1-C5 perfluoroalkyl group; p is an integer of 0 to 5; q is an integer of 0 to 5, or those represented by formula (31):

$$CFX=CXOCF_2OR \quad (31)$$

wherein X is F or H; R is a C1-C6 linear or branched fluoroalkyl group, a C5-C6 cyclic fluoroalkyl group, or a fluorooxyalkyl group; 1 or 2 atoms selected from H, Cl, Br, and I may be included therein.

Preferable among those represented by formulas (30) and (31) are PAVE. Perfluoro(methyl vinyl ether) and perfluoro(propyl vinyl ether), and in particular perfluoro(methyl vinyl ether).

Each of these may be used alone, or any of these may be used in combination.

The copolymerization ratio of the VdF and the specific fluoroolefin is not limited as long as the ratio of the VdF is higher than 20 mol %. A preferable VdF rubber contains 45 to 85 mol % of the VdF and 55 to 15 mol % of the specific fluoroolefin, and a more preferable VdF rubber contains 50 to 80 mol % of the VdF and 50 to 20 mol % of the specific fluoroolefin.

Specifically, the combination of the VdF and the specific fluoroolefin is preferably at least one copolymer selected from a VdF/HFP copolymer, VdF/HFP/TFE copolymer, VdF/PAVE copolymer, VdF/TFE/PAVE copolymer, VdF/HFP/PAVE copolymer, and VdF/HFP/TFE/PAVE copolymer.

In the VdF/HFP copolymer, the VdF/HFP composition is preferably 45 to 85/55 to 15 mol %, more preferably 50 to 80/50 to 20 mol %, and further preferably 60 to 80/40 to 20 mol %.

In the VdF/TFE/HFP copolymer, the VdF/TFE/HFP composition is preferably 40 to 80/10 to 35/10 to 35 mol %.

In the VdF/PAVE copolymer, the VdF/PAVE composition is preferably 65 to 90/35 to 10 mol %.

In the VdF/TFE/PAVE copolymer, the VdF/TFE/PAVE composition is preferably 40 to 80/3 to 40/15 to 35 mol %.

In the VdF/HFP/PAVE copolymer, the VdF/HFP/PAVE composition is preferably 65 to 90/3 to 25/3 to 25 mol %.

In the VdF/HFP/TFE/PAVE copolymerization, the VdF/HFP/TFE/PAVE composition is preferably 40 to 90/0 to 25/0 to 40/3 to 35, and more preferably 40 to 80/3 to 25/3 to 40/3 to 25 mol %.

The amount of the monomer having a cyano group, carboxyl group, or alkoxycarbonyl group is preferably 0.1 to 5 mol %, and more preferably 0.3 to 3 mol %, relative to the total amount of the VdF and the specific fluoroolefin for good cross-linking characteristics and heat resistance.

Examples of the monomer having a cyano group, carboxyl group, or alkoxycarbonyl group include monomers represented by formulas (32) to (35):

$$CY^1_2=CY^1(CF_2)_n-X^1 \quad (32)$$

wherein $Y^1$ is a hydrogen atom or a fluorine atom; n is an integer of 1 to 8;

$$CF_2=CFCF_2R_f^6-X^1 \quad (33)$$

wherein $R_f^6$ is $-(OCF_2)_n-$ or $-(OCF(CF_3))_n-$; n is an integer of 0 to 5;

$$CF_2=CF(OCF_2CF(CF_3))_mO(CF_2)_n-X^1 \quad (34)$$

wherein m is an integer of 0 to 5; n is an integer of 1 to 8;

$$CF_2=CF(OCF_2CF(CF_3))_m-X^1 \quad (35)$$

wherein m is an integer of 1 to 5;
in formulas (32) to (35), $X^1$ is a cyano group (—CN group), carboxyl group (—COOH group), or alkoxycarbonyl group (—COOR group, R is a C1-C10 alkyl group optionally having a fluorine atom). Each of these may be used alone, or any of these may be used in combination.

The VdF rubber having these specific cross-linkable groups may be produced by a common method.

These cross-linkable groups may be introduced by the method disclosed in WO 00/05959.

The VdF rubber having a specific cross-linkable group preferably has a Mooney viscosity ($ML_{1+10}(121°\text{C.})$) of 5 to 140, further preferably 5 to 120, and particularly preferably 5 to 100, for good processibility.

(TFE/Pr Rubber Having Specific Cross-Linkable Group)

The TFE/Pr rubber having a specific cross-linkable group is a non-perfluoro fluororubber having 40 to 70 mol % of TFE units, 30 to 60 mol % of Pr units, and monomer units having cyano groups, carboxyl groups, or alkoxycarbonyl groups.

The rubber may have 0 to 15 mol % of VdF units and/or 0 to 15 mol % of PAVE units if necessary.

The amount of the TFE units is 40 to 70 mol %, and preferably 50 to 65 mol %; the TFE units in such an amount provide elastomeric properties with Pr units.

The amount of the Pr units is 30 to 60 mol %, and preferably 35 to 50 mol %; the Pr units in such an amount provide elastomeric properties with TFE units.

With respect to the monomers having a cyano group, carboxyl group, or alkoxycarbonyl group, the monomers mentioned as preferable for the VdF rubber having a specific cross-linkable group can be also used for the TFE/Pr rubber having a specific cross-linkable group.

The amount of the VdF units or PAVE units, which are not essential units, is preferably up to 15 mol %, and further preferably up to 10 mol %. A larger amount of the former units causes poor amine resistance, while a larger amount of the latter units causes high cost.

The TFE/Pr rubber having a specific cross-linkable group generally has a Mooney viscosity $(ML_{1+10}(121° C.))$ of 5 to 100. A Mooney viscosity of less than 5 causes poor cross-linkability, so that a cross-linked rubber cannot have sufficient physical properties. In contrast, a Mooney viscosity of higher than 100 causes poor fluidity, and thus tends to cause poor molding processibility. The Mooney viscosity $(ML_{1+10}(121° C.))$ is preferably 10 to 80.

The TFE/Pr rubber having a specific cross-linkable group may be produced by a common emulsion polymerization method, but the polymerization rate of TFE and Pr is relatively slow in this method. In the two-step polymerization (seed polymerization) method, for example, the rubber can be efficiently produced.

The amount of the oxazole, thiazole, or imidazole cross-linking agent is preferably 0.1 to 20 parts by mass, and more preferably 0.5 to 10 parts by mass, to 100 parts by mass of the specific fluororubber. If the amount of the cross-linking agent is less than 0.1 parts by mass, the mechanical strength, heat resistance, and chemical resistance tend not to be sufficient for practical use. In contrast, if the amount thereof is more than 20 parts by mass, cross-linking tends to take a long time and a cross-linked product tends to be hard, likely resulting in flexibility loss.

In the case of using a cross-linking aid (D) in combination in these oxazole cross-link system, thiazole cross-link system, and imidazole cross-link system, the amount of the cross-linking aid (D) is 0.01 to 10 parts by mass, preferably 0.02 to 5 parts by mass, and more preferably 0.05 to 3 parts by mass, to 100 parts by mass of the aforementioned specific fluororubber, in general.

(Triazine Cross-Link System)

The triazine cross-link system is a cross-link system which causes a low compression set and excellent heat resistance. In the triazine cross-link system, only a cross-linking aid (D) that initiates cross-linking reaction is used.

Examples of the cross-linking aid (D) used in the triazine cross-link system include (D1) compounds generating ammonia at 40° C. to 330° C. and (D2) particulate inorganic nitrides which are cross-linking aids capable of being used together with a cross-linking agent in the oxazole cross-link system, thiazole cross-link system, and imidazole cross-link system.

Of the specific cross-linkable group-containing fluororubbers which are the targets of the oxazole cross-link system, thiazole cross-link system, and imidazole cross-link system, the target fluororubber of the triazine cross-link system is preferably a fluororubber in which at least one cross-linkable group is a cyano group.

The amount of the ammonia-generating compound (D1) may be appropriately adjusted depending on the amount of ammonia to be generated. In general, the amount thereof is 0.05 to 10 parts by mass, preferably 0.1 to 5 parts by mass, and more preferably 0.2 to 3 parts by mass, to 100 parts by mass of the cyano group-containing fluororubber. Too small an amount of the ammonia-generating compound tends to cause a low cross-linking density, so that the heat resistance and chemical resistance tend to be insufficient for practical use. In contrast, too large an amount thereof may cause scorch, so that the storage stability tends to be poor.

The amount of the particulate inorganic nitride (D2) is generally 0.1 to 20 parts by mass, preferably 0.2 to 5 parts by mass, and more preferably 0.2 to 1 parts by mass, to 100 parts by mass of the cyano group-containing fluororubber. If the amount of the particulate inorganic nitride (D2) is less than 0.1 parts by mass, the cross-linking density tends to be low, so that the heat resistance and chemical resistance tend to be insufficient for practical use. If the amount thereof is more than 20 parts by mass, scorch may occur, so that the storage stability tends to be poor.

In the present invention, the cross-link system is preferably the peroxide cross-link system, polyol cross-link system, oxazole cross-link system, thiazole cross-link system, imidazole cross-link system, or triazine cross-link system. Particularly preferable is the peroxide cross-link system, oxazole cross-link system, thiazole cross-link system, imidazole cross-link system, or triazine cross-link system. In the respective cross-link systems, it is preferable to use a suitable cross-linking agent (C) or cross-linking aid (D).

If necessary, the fluororubber composition used in the present invention may further contain common additives for rubber such as filler, processing aid, plasticizer, colorant, tackifier, adhesion promoter, acid acceptor, pigment, flame retardant, lubricant, photo stabilizer, weather-resistant stabilizer, antistatic agent, ultraviolet absorber, antioxidant, release agent, foaming agent, perfume, oil, and softener, and other polymers such as polyethylene, polypropylene, polyamide, polyester, and polyurethane to the extent that the effects of the present invention are not deteriorated.

Examples of the filler include: metal oxides such as calcium oxide, magnesium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; metal sulfides such as synthesized hydrotalcite, molybdenum disulfide, iron sulfide, and copper sulfide; diatomaceous earth, asbestos, lithopone (zinc sulfide/barium sulfide), graphite, carbon fluoride, calcium fluoride, coke, fine particulate quartz, talc, powdery mica, Wollastonite, fibrous carbon, fibrous aramid, various whiskers, fibrous glass, organic reinforcing agent, organic filler, polytetrafluoroethylene, mica, silica, celite, and clay. Further, examples of the acid acceptor include calcium oxide, magnesium oxide, lead oxide, zinc oxide, magnesium hydroxide, calcium hydroxide, aluminum hydroxide, and hydrotalcite. Each of these may be used alone, or two or more of these may be appropriately used in combination. These may be added at any step in the aforementioned mixing method; they are preferably added upon mixing the fluororubber and the carbon black with an internal mixer or a roll mixer.

Examples of the processing aid include: higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; petroleum wax such as carnauba wax and ceresin wax; polyglycols such as ethylene glycol, glycerine, and diethylene glycol; aliphatic hydrocarbons such as vaseline and paraffin; silicone oils, silicone polymers, low molecular weight polyethylene, phthalic acid esters, phosphoric acid esters, rosin, (halogenated) dialkylamines, surfactants, sulfone compounds, fluorine aids, and organic amine compounds.

In particular, the organic amine compound and the acid acceptor are preferable additives because, in the case that they are blended upon mixing the fluororubber (A) and the carbon black (B) with an internal mixer or a roll mixer, they improve reinforceability. The mixing is preferably performed at the highest mixing temperature Tm of 80° C. to 220° C.

Preferable examples of the organic amine compound include primary amines represented as $R^1NH_2$, secondary amines represented as $R^1R^2NH$, and tertiary amine represented as $R^1R^2R^3N$. $R^1$, $R^2$, and $R^3$ may be the same as or different from each other and each of these is preferably a C1-C50 alkyl group. The alkyl group may have a benzene ring as a functional group, or may have a double bond and/or conjugated double bond. Further, the alkyl group may have a linear shape or a branched shape.

Examples of the primary amine include coconut amine, octyl amine, lauryl amine, stearyl amine, oleyl amine, beef tallow amine, 17-phenyl-heptadecylamine, octadeca-7,11-dienylamine, octadeca-7,9-dienylamine, octadec-9-enylamine, 7-methyl-octadec-7-enylamine. Examples of the secondary amine include distearylamine. Examples of the tertiary amine include dimethyloctylamine, dimethyldecylamine, dimethyllaurylamine, dimethylmyristylamine, dimethylpalmitylamine, dimethylstearylamine, and dimethylbehenylamine. Particularly preferable are amines, especially primary amines, having about 20 carbon atoms because they are easily available and they improve reinforceability.

The amount of the organic amine compound is preferably 0.01 to 5 parts by mass to 100 parts by mass of the fluororubber (A). Too large an amount of the organic amine compound tends to cause difficulty in mixing, while too small an amount thereof tends to cause poor reinforceability. The amount with respect to 100 parts by mass of the fluororubber (A) is further preferably 0.1 parts by mass or more from the viewpoint of reinforceability and 4 parts by mass or less from the viewpoints of reinforceability and easy mixing.

The acid acceptor is preferably a metal hydroxide such as calcium hydroxide; a metal oxide such as magnesium oxide or zinc oxide; or hydrotalcite among the aforementioned examples from the viewpoint of reinforceability, for example, and it is particularly preferably zinc oxide.

The amount of the acid acceptor is preferably 0.01 to 10 parts by mass to 100 parts by mass of the fluororubber (A). Too large an amount of the acid acceptor tends to cause poor physical properties, while too small an amount thereof tends to cause poor reinforceability. The amount with respect to 100 parts by mass of the fluororubber (A) is further preferably 0.1 parts by mass or more from the viewpoint of reinforceability, while it is preferably 8 parts by mass or less, and more preferably 5 parts by mass or less, from the viewpoints of physical properties and easy mixing.

Examples of the tackifier include coumarone resin, coumarone-indene resin, coumarone-indene-styrene resin, naphthene resin, phenol resin, rosin, rosin ester, hydrogenated rosin derivative, terpene resin, modified terpene resin, terpene-phenol resin, hydrogenated terpene resin, α-pinene resin, alkylphenol-acethylene resin, alkylphenol-formaldehyde resin, styrene resin, C5 petroleum resin, C9 petroleum resin, cycloaliphatic petroleum resin, C5/C9 copolymer petroleum resin, xylene-formaldehyde resin, polyfunctional methacrylates, polyfunctional acrylates, metal oxides (e.g. magnesium oxide), and metal hydroxides. The amount thereof is preferably 1 to 20 parts by mass to 100 parts by mass of the fluororubber (A). These tackifier may be used alone, or two or more of these may be used in combination.

The complex-shaped fluororubber formed product of the present invention comprises a cross-linked fluororubber layer obtainable by cross-linking the fluororubber composition used in the present invention.

The complex-shaped fluororubber formed product of the present invention may have a monolayer structure consisting of a cross-linked fluororubber layer, or may have a multilayer structure comprising layers made from other materials.

Except that the aforementioned fluororubber composition is used as a rubber composition, the complex-shaped formed product of the present invention can be produced by a conventional method for producing a formed product having a complex shape. For example, the formed product may be produced by cross-linking and molding the fluororubber composition using a mold corresponding to the complex shape, and then releasing the cross-linked rubber composition from the mold.

The cross-linking and molding method for obtaining a complex-shaped formed product may be appropriately selected. For example, the product can be obtained by cross-linking and molding a rubber composition using a common rubber molding machine provided with a mold for a complex shape. Examples of the rubber molding machine include a compression press, encapsulation-molding machine, and injection-molding machine, and cross-linking is achieved by heating. If secondary curing is required depending on the usage of the cross-linked product, a cross-linked product obtained by the aforementioned method may be further secondarily cured in an oven.

For example, a bellows-structured formed product may be produced by a method comprising the following steps:

(I) mixing the fluororubber (A), a carbon black (B), a cross-linking agent (C) (and/or a cross-linking aid (D)), and, if necessary, a cross-linking accelerator to prepare a fluororubber composition;

(II) charging the fluororubber composition into a compression press molding machine provided with a mold for a bellows structure;

(III) cross-linking the fluororubber composition at 130° C. to 230° C. to form a cross-linked formed product comprising a cross-linked fluororubber layer; and (IV) releasing the obtained cross-linked formed product from the mold at 130° C. to 230° C.

The obtained cross-linked fluororubber layer has a loss modulus E" of 400 kPa or higher and 6000 kPa or lower determined by a dynamic viscoelasticity test (measurement mode: tensile, chuck distance: 20 mm, measurement temperature: 160° C., tensile strain: 1%, initial force: 157 cN, and frequency: 10 Hz). The loss modulus E is measured using a cuboid specimen with a size of 3 mm in width×2 mm in thickness.

If the loss modulus E" is within the above range, the rubber layer has particularly excellent normal state at room temperature and mechanical properties at high temperatures. The lower limit thereof is preferably 420 kPa, and more preferably 430 kPa; while the upper limit thereof is preferably 5,900 kPa, and more preferably 5,800 kPa.

For improved mechanical properties at high temperatures, the cross-linked fluororubber layer further preferably has a storage modulus E' of 1,500 kPa or higher and 20,000 kPa or lower determined by a dynamic viscoelasticity test (measurement mode: tensile, chuck distance: 20 mm, measurement temperature: 160° C., tensile strain: 1%, initial force: 157 cN, and frequency: 10 Hz). The lower limit thereof is preferably 1,600, and more preferably 1,800, while the upper limit thereof is preferably 19,000, and more preferably 18,000. The storage modulus E' is measured using a cuboid specimen with a size of 3 mm in width×2 mm in thickness.

The cross-linked fluororubber layer preferably has a tensile elongation at break at 160° C. of 140 to 700%, more preferably 150 to 700%, further preferably 180% or higher, and particularly preferably 200% or higher, while preferably 650% or lower, and particularly preferably 600% or lower, because such a rubber layer gives excellent demoldability to the complex-shaped formed product.

The cross-linked fluororubber layer preferably has a tensile strength at break at 160° C. of 3 to 20 MPa, further preferably 3.5 MPa or higher, and particularly preferably 4 MPa or higher, while preferably 17 MPa or lower, and particularly preferably 15 MPa or lower, because such a rubber layer gives excellent demoldability to the complex-shaped formed product.

The cross-linked fluororubber layer preferably has a tear strength at 160° C. of 3 to 30 kN/m, further preferably 4 kN/m or higher, and particularly preferably 5 kN/m or higher, while preferably 29 kN/m or lower, and particularly preferably 28 kN/m or lower, because such a rubber layer gives excellent demoldability to the complex-shaped formed product.

The tensile strength at break and elongation at break are measured using a #6 dumbbell in accordance with JIS-K 6251.

The cross-linked fluororubber layer preferably has a tensile elongation at break at 200° C. of 110 to 700%, more preferably 120 to 700%, further preferably 150% or higher, and particularly preferably 200% or higher, while preferably 650% or lower, and particularly preferably 600% or lower, because such a rubber layer gives excellent demoldability to the complex-shaped formed product.

The cross-linked fluororubber layer preferably has a tensile strength at break at 200° C. of 2 to 20 MPa, further preferably 2.2 MPa or higher, and particularly preferably 2.5 MPa or higher, while preferably 17 MPa or lower, and particularly preferably 15 MPa or lower, because such a rubber layer gives excellent demoldability to the complex-shaped formed product.

The cross-linked fluororubber layer preferably has a tear strength at 200° C. of 3 to 30 kN/m, further preferably 4 kN/m or higher, and particularly preferably 5 kN/m or higher, while preferably 29 kN/m or lower, and particularly preferably 28 kN/m or lower, because such a rubber layer gives excellent demoldability to the complex-shaped formed product.

The cross-linked fluororubber layer preferably has a tensile elongation at break at 230° C. of 80 to 700%, more preferably 100 to 700%, further preferably 120% or higher, and particularly preferably 130% or higher, while preferably 650% or lower, and particularly preferably 600% or lower, because such a rubber layer gives excellent demoldability to the complex-shaped formed product.

The cross-linked fluororubber layer preferably has a tensile strength at break at 230° C. of 1 to 20 MPa, further preferably 1.2 MPa or higher, and particularly preferably 1.5 MPa or higher, while preferably 17 MPa or lower, and particularly preferably 15 MPa or lower, because such a rubber layer gives excellent demoldability to the complex-shaped formed product.

The cross-linked fluororubber layer preferably has a tear strength at 230° C. of 3 to 30 kN/m, further preferably 4 kN/m or higher, and particularly preferably 5 kN/m or higher, while preferably 29 kN/m or lower, and particularly preferably 28 kN/m or lower, because such a rubber layer gives excellent demoldability to the complex-shaped formed product.

In the case of producing a multilayer complex-shaped formed product, other layers made of other materials may be stacked with the fluororubber composition before cross-linking the fluororubber composition, or they may be stacked with the fluororubber composition after cross-linking the fluororubber composition to form a cross-linked fluororubber layer.

In the multilayer complex-shaped formed product, layers made of other materials may be layers made of other rubbers, thermoplastic resin layers, fiber-reinforced layers, canvas, and metal foil layers, for example.

In the case that chemical resistance and flexibility are particularly required, other rubbers preferably include at least one selected from the group consisting of acrylonitrile-butadiene rubber and hydrogenated rubber thereof, rubber blend of acrylonitrile-butadiene rubber and polyvinyl chloride, fluororubber, epichlorohydrin rubber, EPDM, and acrylic rubber. They more preferably include at least one selected from the group consisting of acrylonitrile-butadiene rubber and hydrogenated rubber thereof, rubber blend of acrylonitrile-butadiene rubber and polyvinyl chloride, fluororubber, and epichlorohydrin rubber.

Further, the thermoplastic resin is preferably a thermoplastic resin comprising at least one selected from the group consisting of fluorine resin, polyamide resin, polyolefin resin, polyester resin, polyvinyl alcohol resin, polyvinyl chloride resin, and polyphenylene sulfide resin. The thermoplastic resin is more preferably a thermoplastic resin comprising at least one selected from the group consisting of fluorine resin, polyamide resin, polyvinyl alcohol resin, and polyphenylene sulfide resin.

In the case of forming a multilayer complex-shaped formed product, surface treatment may be optionally performed. The surface treatment is not particularly limited as long as it allows bonding. Examples thereof include discharging treatment such as plasma discharge and corona discharge, and wet treatment such as treatment with a metallic sodium/naphthalene solution. Further, priming is suitable as surface treatment. Priming can be performed in accordance with a common method. In the case of priming, the surface of a fluorine resin which is not surface-treated may be treated; it is more effective to perform priming after prior treatment such as plasma discharge, corona discharge, or treatment with a metallic sodium/naphthalene solution.

The complex-shaped formed product of the present invention may be used as a formed product in various fields such as the industrial vehicles field (e.g. automobiles, vehicle-type construction machinery, vehicle-type agricultural machinery, and railway vehicles); manufacturing and mining machinery fields (e.g. machine tools, construction machinery, agricultural machinery, mining machinery, industrial robots, chemical plants, coating machinery, chemical transferring machinery, food industrial machinery, and hydraulic tools); the shipping field and the airplane field.

Examples of the complex-shaped formed product of the present invention include bellows-structured formed products. Specific examples thereof include joint members such as flexible joints and expansion joints, boots, and grommets.

The joint members are joints for piping and piping equipment; they are used for the purposes of preventing vibration and noise generated by piping systems; absorbing expansion/contraction and displacement due to changes in temperature and pressure; absorbing dimension change; mitigating and preventing the influence of earthquakes and land subsidence; and the like.

The flexible joints and expansion joints can be suitably used as complex-shaped formed products for shipbuilding piping, machinery piping (e.g. pumps and compressors), chemical plant piping, electric piping, civil engineering and water piping, and automobiles.

The boots can be suitably used as complex-shaped formed products for various industrial boots such as automobile boots (e.g. constant-velocity joint boots, dust covers, rack and pinion steering boots, pin boots, and piston boots), agricultural machinery boots, industrial vehicles boots, construction machinery boots, oil pressure machinery boots, air pressure machinery boots, centralized lubricating system boots, liquid transferring boots, firefighting boots, and liquefied gas transferring boots. The complex-shaped formed product of the present invention is suitable for the primer valve described below. Examples of the primer valves include the primer valve for vehicle, the primer valve for ship and vessels, the primer valve for airplane, the primer valve for construction equipment, the primer valve for agricultural machines and the primer valve for mining machines. Especially, the complex-shaped formed product is more suitable for the primer valve for ship and vessel.

The complex-shaped formed product of the present invention is suitable for the diaphragms described below.

Examples of the diaphragms include those for vehicle engines, specifically those used in the fuel system, exhaust system, braking system, drive system, and ignition system, which need to have heat resistance, oxidation resistance, fuel resistance, and low gas permeability.

Examples of the diaphragms used in the fuel system of a vehicle engine include: diaphragms for fuel pumps, diaphragms for carburetors, diaphragms for pressure regulators, diaphragms for pulsation dampers, diaphragms for ORVR, diaphragms for canisters, and diaphragms for auto fuel cocks.

Examples of the diaphragms used in the exhaust system of a vehicle engine include: diaphragms for waste gates, diaphragms for actuators, and diaphragms for EGR.

Examples of the diaphragms used in the braking system of a vehicle engine include diaphragms for air braking.

Examples of the diaphragms used in the drive system of a vehicle engine include diaphragms for oil pressure.

Examples of the diaphragms used in the ignition system of a vehicle engine include diaphragms for distributors.

Examples of the diaphragms in addition to those for vehicle engines includes: diaphragms for general pumps, diaphragms for valves, diaphragms for filter press, diaphragms for blower, diaphragms for air conditioners, diaphragms for control equipments, diaphragms for water supply, diaphragms for pumps transferring hot water used for hot-water supply and the like, diaphragms for high-temperature steam, diaphragms for semiconductor devices (for example, diaphragms for transferring chemicals used in a manufacturing process), diaphragms for food-processing devices, diaphragms for liquid storage tanks, diaphragms for pressure switches, diaphragms used oil exploration and oil drilling (for example, diaphragms for lubricant oil supply, such as oil drill bits), diaphragms for gas appliances such as instantaneous gas water heaters and gas meters, diaphragms for accumulators, diaphragms for air springs such as suspensions, diaphragms for screw feeders for ships and boats, and diaphragms for medical artificial hearts, which need to have heat resistance, oil resistance, chemical resistance, steam resistance, and low gas permeability.

EXAMPLES

The present invention will be described referring to, but not limited to, examples.

Measurement methods of physical properties adopted in the present invention are as follows.

(1) Dynamic Viscoelasticity Test 1 (Loss Modulus E" and Storage Modulus E')
(Measurement Device)
Dynamic viscoelasticity measurement device DVA-220 (IT Keisoku Seigyo K.K.)
(Measurement Conditions)
Strain distribution is measured under the following conditions, and then the loss modulus E" and the storage modulus E' at 1% tensile strain are calculated.
Specimen: cross-linked rubber cuboid having a size of 3 mm in width×2 mm in thickness
Measurement mode: tensile
Chuck distance: 20 mm
Measurement temperature: 160° C.
initial force: 157 cN
Frequency: 10 Hz (2) Dynamic Viscoelasticity Test 2 (Shear Modulus G')
(Measurement Device)
Rubber process analyzer (model: RPA2000, ALPHA TECHNOLOGY Co., LTD.)
(Measurement Conditions)
Strain distribution is measured at 100° C. and 1 Hz, whereby the shear modulus G' is determined. At this time, G' is measured for the respective dynamic strains 1% and 100%, and thereby δG' (G' (1%)−G'(100%)) is calculated.

(3) Tensile Strength at Break, Elongation at Break, and Tear Strength
The tensile strength and elongation at break are measured using RTA-1T (ORIENTEC Co., LTD.), AG-I (SHIMADZU Corp.), and a dumbbell #6 in accordance with JIS-K 6251. The measurement temperatures are 25° C., 160° C., 200° C., and 230° C. Further, the unnicked angle tear strength is measured. The measurement temperatures are 25° C., 160° C., and 200° C.

(4) Evaluation of Demoldability of Complex-Shaped Rubber Formed Product
A predetermined amount of a fluororubber full compound is charged into a mold shown in FIG. 1 (L1=10 mmφ, L2=12 mm, L3=8 mm, L4=2 mm, thickness of formed product=2 mmt) comprising a sub-mold A and a sub-mold B, and compression-molded under predetermined conditions. After the molding, the formed product 1 is released from the sub-mold A with a 1.5 MPaG air blow. At this time, those suffering cracking and tearing are treated as defectives. Molding is performed five times, and the fraction defective is calculated.

(5) Mooney Viscosity ($ML_{1+10}$(100° C.))
The Mooney viscosity was determined in accordance with ASTM-D 1646 and JIS-K 6300. The measurement temperature is 100° C.

In the examples and comparative examples, the following fluororubber, carbon black, cross-linking agent, and cross-linking accelerator were used.
(Fluororubber)
A1: Pure water (0.99 L), a 50% aqueous solution of $CH_2=CFCF_2OCF(CF_3)CF_2OCF(CF_3)COONH_4$ (0.2 g), and a 50% aqueous solution of $F(CF_2)_3COONH_4$ (1.072 g) were charged into a 3-L stainless-steel autoclave, and the air inside the system was sufficiently replaced with nitrogen gas. The mixture was stirred at 600 rpm and heated to 80° C., and then monomers were injected under pressure so that the initial monomer composition in the tank was VdF/HFP=50/50 mol % and 1.52 MPa was achieved. A polymerization initiator solution prepared by dissolving APS (23.6 mg) into pure water (5 ml) was injected under nitrogen gas pressure, and thus a reaction was initiated. When the internal pressure was down to 1.42 MPa as the polymerization proceeded, a mixed monomer (VdF/HFP=78/22 mol %), which is an additional monomer, was injected under pressure until the internal pressure reached 1.52 MPa. At this time, a diiodine compound I(CF$_2$)$_4$I (1.65 g) was injected. While the pressure was repeatedly increased and decreased, an aqueous solution of APS (23.6 mg)/pure water (5 ml) was injected under nitrogen gas pressure every 3 hours, and thereby the polymerization reaction was continued. As 333 g in total of the mixed monomer was added, unreacted monomers were removed and the autoclave was cooled down. Thereby, a fluororubber dispersion with a solid content concentration of 24.1% by mass was obtained. NMR analysis on the fluororubber showed that the copolymer composition was VdF/HFP=78/22 (mol %), and the Mooney viscosity (ML$_{1+10}$(100° C.)) was 55. This fluororubber was named Fluororubber A1.

A2: Except that the initial monomer in the tank was VdF/TFE/HFP=19/11/70 mol %, the additional monomer was VdF/TFE/HFP=51/20/29 mol %, the amount of the diiodine compound I(CF$_2$)$_4$I was 1.03 g, and 1.67 g of ICH$_2$CF$_2$CF$_2$OCF=CF$_2$ was added after 15 g in total of the mixed monomer was added, polymerization was performed in the same manner as in the method of producing Fluororubber A1. Thereby, a dispersion with a solid content concentration of 23.2% by mass was obtained. The copolymer composition of this fluororubber was VdF/TFE/HFP=52/22/26 (mol %), and the Mooney viscosity (ML$_{1+10}$(100° C.)) was 75. This fluororubber was named Fluororubber A2.
(Carbon Black)

B1: HAF (N$_2$SA=79 m$^2$/g, DBP oil absorption=101 ml/100 g), "SEAST 3" (trade name, Tokai Carbon Co., Ltd.)

B2: MT (N$_2$SA=8 m$^2$/g, DBP oil absorption=43 ml/100 g), "Thermax N 990" (trade name, Cancarb)

B3: FEF (N$_2$SA=42 m$^2$/g, DBP oil absorption=115 ml/100 g), "SEAST SO" (trade name, Tokai Carbon Co., Ltd.)

B4: ISAF (N$_2$SA=119 m$^2$/g, DBP oil absorption=114 ml/100 g), "SEAST 6" (trade name, Tokai Carbon Co., Ltd.)
(Cross-Linking Agent)

2,5-Dimethyl-2,5-di(t-butylperoxy)hexane, "PERHEXA 25B" (trade name, NOF Corp.)
(Cross-Linking Accelerator)

Triallyl isocyanurate (TAIC), "TAIC" (trade name, Nippon Kasei Chemical Co., Ltd.)
(Processing Aid)

Stearylamine (FARMIN 86T, Kao Corp.)
(Acid Acceptor)

Zinc oxide (#1, Sakai Chemical Industry Co., Ltd.)

Example 1

Fluororubber A1 (100 parts by mass) was mixed with Carbon black B1 (30 parts by mass) using a mixer (TD 35 100 MB, Toshin Co., Ltd., rotor diameter: 30 cm, tip clearance: 0.1 cm) under the mixing conditions of front rotor speed: 29 rpm and back rotor speed: 24 rpm. Thereby, a fluororubber precompound was prepared. The maximum temperature of the discharged mixed product was 170° C.

Thereafter, the fluororubber precompound was mixed with a cross-linking agent (1 part by mass), a cross-linking accelerator (TAIC, 1.5 parts by mass), and zinc oxide (1 part by mass) for 30 minutes using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound was prepared. The maximum temperature of the discharged mixed product was 71° C.

Then, the obtained fluororubber full compound was subjected to the dynamic viscoelasticity test 2, and thereby the δG' was determined. Table 1 shows the results.

Further, this fluororubber full compound was pressed at 160° C. for 30 minutes to be cross-linked, so that a 2-mm thick sheet specimen was produced. Using the obtained cross-linked sheet, the elongation at break, tensile strength, and tear strength were measured. Table 2 shows the results.

Furthermore, the obtained cross-linked fluororubber was subjected to the dynamic viscoelasticity test 1, and thereby the loss modulus E" and storage modulus E' were determined. Table 2 shows the results.

Using the mold shown in FIG. 1, the obtained fluororubber full compound was cross-linked and molded at 160° C. for 30 minutes into a complex-shaped formed product having a bellows shape. At this time, the fraction defective was determined. Table 2 shows the result.

Examples 2 and 3

The fluororubber A1 (100 parts by mass) was mixed with one of the carbon blacks B1 and B2, a cross-linking agent, cross-linking accelerator (TAIC), and zinc oxide each in an amount shown in Table 1 for 30 minutes using an 8-inch open roll mixer (KANSAI ROLL Co., Ltd.) under the conditions of front roll speed: 21 rpm, back roll speed: 19 rpm, and gap distance between rolls: 0.1 cm. Thereby, a fluororubber full compound was prepared. The maximum temperature of the discharged mixed product was 70° C.

The obtained fluororubber full compound was subjected to the dynamic viscoelasticity test 2, and thereby the δG' was determined. Table 1 shows the results.

Then, the obtained fluororubber full compound was pressed at 160° C. for 30 minutes to be cross-linked. Thereby, a 2-mm thick sheet specimen was prepared. The tensile strength at break, the elongation at break, and the tear strength of the obtained cross-linked sheet were measured. Table 2 shows the results.

Further, the obtained cross-linked fluororubber was subjected to the dynamic viscoelasticity test 1, and thereby the loss modulus E" and storage modulus E' were determined. Table 2 shows the results.

Using the mold shown in FIG. 1, the obtained fluororubber full compound was cross-linked and molded at 160° C. for 30 minutes into a complex-shaped formed product having a bellows shape. At this time, the fraction defective was determined. Table 2 shows the results.

Example 4

The fluororubber A1 (100 parts by mass) was mixed with the carbon black B3 (20 parts by mass), stearylamine (0.5 parts by mass), and zinc oxide (1.0 part by mass) using a mixer (MixLabo 0.5 L, Moriyama Company Ltd., rotor diameter: 6.6 cm, tip clearance: 0.05 cm) under the mixing conditions of front rotor speed: 60 rpm and back rotor speed: 50 rpm. Thereby, a fluororubber precompound was prepared. The maximum temperature of the discharged mixed product was 175° C.

The obtained fluororubber precompound (121.5 parts by mass) was mixed with a cross-linking agent (0.75 parts by mass), cross-linking accelerator (TAIC, 0.5 parts by mass), and stearylamine (0.5 parts by mass) for 30 minutes using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound was prepared. The maximum temperature of the discharged mixed product was 71° C.

Then, the obtained fluororubber full compound was subjected to the dynamic viscoelasticity test 2, and thereby the δG' was determined. Table 1 shows the results.

Further, this fluororubber full compound was pressed at 170° C. for 30 minutes to be cross-linked, so that a 2-mm thick sheet specimen was produced. Using the obtained cross-linked sheet, the elongation at break, tensile strength, and tear strength were determined. Table 2 shows the results.

Furthermore, the obtained cross-linked fluororubber was subjected to the dynamic viscoelasticity test 1, and thereby the loss modulus E" and storage modulus E' were determined. Table 2 shows the results.

Using the mold shown in FIG. 1, the obtained fluororubber full compound was cross-linked and molded at 170° C. for 30 minutes into a complex-shaped formed product having a bellows shape. At this time, the fraction defective was determined. Table 2 shows the result.

Example 5

Except that the carbon black B4 was used, a fluororubber precompound was prepared in the same manner as in Example 4. The maximum temperature of the discharged mixed product was 168° C. In addition, except that the amount of the cross-linking accelerator (TAIC) was changed to 4 parts by mass, a fluororubber full compound was prepared under the same conditions as in Example 4. The maximum temperature of the discharged mixed product was 73° C.

Then, the obtained fluororubber full compound was subjected to the dynamic viscoelasticity test 2, and thereby the δG' was determined. Table 1 shows the results.

Further, this fluororubber full compound was pressed at 170° C. for 30 minutes to be cross-linked, so that a 2-mm thick sheet specimen was produced. Using the obtained cross-linked sheet, the elongation at break, tensile strength, and tear strength were determined. Table 2 shows the results.

Furthermore, the obtained cross-linked fluororubber was subjected to the dynamic viscoelasticity test 1, and thereby the loss modulus E" and storage modulus E' were determined. Table 2 shows the results.

Using the mold shown in FIG. 1, the obtained fluororubber full compound was cross-linked and molded at 170° C. for 30 minutes into a complex-shaped formed product having a bellows shape. At this time, the fraction defective was determined. Table 2 shows the result.

TABLE 1

| Composition (parts by mass) | Example 1 | Example 2 | Example 3 | Example 4 | Example 5 |
| --- | --- | --- | --- | --- | --- |
| Fluororubber A1 | 100 | 100 | 100 | 100 | 100 |
| Fluororubber A2 | — | — | — | — | — |
| Carbon black B1 | 30 | 30 | — | — | — |
| Carbon black B2 | — | — | 30 | — | — |
| Carbon black B3 | — | — | — | 20 | — |
| Carbon black B4 | — | — | — | — | 20 |
| Cross-linking accelerator | 1.5 | 1.5 | 1.5 | 0.5 | 4 |
| Cross-linking agent | 1 | 1 | 1 | 0.75 | 0.75 |
| Zinc oxide | 1 | 1 | 1 | 1 | 1 |
| Stearylamine | — | — | — | 1 | 1 |
| Difference δ G' (G'(1%) − G'(100%)) | 481 | 432 | 176 | 430 | 559 |

TABLE 2

|  | Example 1 | Example 2 | Example 3 | Example 4 | Example 5 |
| --- | --- | --- | --- | --- | --- |
| Press-cross-linking conditions | 160° C. 30 min. | 160° C. 30 min. | 160° C. 30 min. | 170° C. 30 min. | 170° C. 30 min. |
| Mechanical properties of cross-linked product |  |  |  |  |  |
| Measurement temperature 25° C. |  |  |  |  |  |
| Tensile strength at break (MPa) | 22.6 | 22.5 | 11.3 | 13.4 | 23.1 |
| Tensile elongation at break (%) | 478 | 486 | 494 | 798 | 433 |
| Tear strength (kN/m) | 47.4 | 42.7 | 33.3 | 36.0 | 43.2 |
| Measurement temperature 160° C. |  |  |  |  |  |
| Tensile strength at break (MPa) | 7.2 | 6.3 | 3.5 | 3.5 | 6.0 |
| Tensile elongation at break (%) | 344 | 308 | 194 | 429 | 233 |
| Tear strength (kN/m) | 15.6 | 17.4 | 11.9 | 10.3 | 17.2 |
| Measurement temperature 200° C. |  |  |  |  |  |
| Tensile strength at break (MPa) | 5.9 | 5.6 | 2.7 | 2.9 | 4.9 |
| Tensile elongation at break (%) | 275 | 266 | 143 | 365 | 203 |
| Tear strength (kN/m) | 13.4 | 14.6 | 12.2 | 9.2 | 14.8 |
| Measurement temperature 230° C. |  |  |  |  |  |
| Tensile strength at break (MPa) | 4.5 | 4.5 | 2.4 | 2.2 | 3.7 |
| Tensile elongation at break (%) | 215 | 224 | 128 | 266 | 147 |
| Dynamic viscoelasticity test (160° C.) |  |  |  |  |  |
| Storage modulus E' (kPa) | 9486 | 8589 | 4862 | 3588 | 10656 |
| Loss modulus E" (kPa) | 2078 | 1804 | 523 | 906 | 1970 |
| Evaluation of bellows-structured formed product |  |  |  |  |  |
| Fraction defective (%) | 0 | 0 | 20 | 20 | 0 |

Example 6

Except that the mixer (MixLabo 0.5 L, Moriyama Company Ltd., rotor diameter: 6.6 cm, tip clearance: 0.05 cm) was operated with front rotor speed: 120 rpm and back rotor speed: 107 rpm, a fluororubber composition precompound was prepared under the same conditions as in Example 5. The maximum temperature of the discharged mixed product was 175° C. In addition, except that the amount of the cross-linking accelerator (TAIC) was changed to 0.5 parts by mass, a fluororubber full compound was prepared under the same conditions as in Example 5. The maximum temperature of the discharged mixed product was 72° C.

Then, the obtained fluororubber full compound was subjected to the dynamic viscoelasticity test 2, and thereby the δG' was determined. Table 3 shows the results.

Further, this fluororubber full compound was pressed at 170° C. for 30 minutes to be cross-linked, so that a 2-mm thick sheet specimen was produced. Using the obtained cross-linked sheet, the elongation at break, tensile strength, and tear strength were determined. Table 4 shows the results.

Furthermore, the obtained cross-linked fluororubber was subjected to the dynamic viscoelasticity test 1, and thereby the loss modulus E" and storage modulus E' were determined. Table 4 shows the results.

Using the mold shown in FIG. 1, the obtained fluororubber full compound was cross-linked and molded at 170° C. for 30 minutes into a complex-shaped formed product having a bellows shape. At this time, the fraction defective was determined. Table 4 shows the result.

Example 7

Except that the fluororubber A2 was used, a fluororubber precompound was prepared under the same conditions as in Example 6. The maximum temperature of the discharged mixed product was 170° C. In addition, a fluororubber full compound was prepared under the same conditions as in Example 6. The maximum temperature of the discharged mixed product was 70° C.

Then, the obtained fluororubber full compound was subjected to the dynamic viscoelasticity test 2, and thereby the δG' was determined. Table 3 shows the results.

Further, this fluororubber full compound was pressed at 170° C. for 30 minutes to be cross-linked, so that a 2-mm thick sheet specimen was produced. Using the obtained cross-linked sheet, the elongation at break, tensile strength, and tear strength were determined. Table 4 shows the results.

Furthermore, the obtained cross-linked fluororubber was subjected to the dynamic viscoelasticity test 1, and thereby the loss modulus E" and storage modulus E' were determined. Table 4 shows the results.

Using the mold shown in FIG. 1, the obtained fluororubber full compound was cross-link-molded at 170° C. for 30 minutes into a complex-shaped formed product having a bellows shape. At this time, the fraction defective was determined. Table 4 shows the result.

Comparative Example 1

Except that the carbon black B2 was used, a fluororubber precompound was prepared under the same conditions as in Example 7. The maximum temperature of the discharged mixed product was 170° C. In addition, a fluororubber full compound was prepared under the same conditions as in Example 6. The maximum temperature of the discharged mixed product was 70° C.

The obtained fluororubber full compound was subjected to the dynamic viscoelasticity test 2, and thereby the δG' was determined. Table 3 shows the results.

Then, the obtained fluororubber full compound was pressed at 170° C. for 30 minutes to be cross-linked, so that a 2-mm thick sheet specimen was produced. Using the obtained cross-linked sheet, the tensile strength at break, elongation at break, and tear strength were determined. Table 4 shows the results.

Furthermore, the obtained cross-linked fluororubber was subjected to the dynamic viscoelasticity test 1, and thereby the loss modulus E" and storage modulus E' were determined. Table 4 shows the results.

Using the mold shown in FIG. 1, the obtained fluororubber full compound was cross-link-molded at 170° C. for 30 minutes into a complex-shaped formed product having a bellows shape. At this time, the fraction defective was determined. Table 4 shows the result.

TABLE 3

| Composition (parts by mass) | Example 6 | Example 7 | Comparative Example 1 |
|---|---|---|---|
| Fluororubber A1 | 100 | — | — |
| Fluororubber A2 | — | 100 | 100 |
| Carbon black B1 | — | — | — |
| Carbon black B2 | — | — | 20 |
| Carbon black B3 | — | — | — |
| Carbon black B4 | 20 | 20 | — |
| Cross-linking accelerator | 0.5 | 0.5 | 0.5 |
| Cross-linking agent | 0.75 | 0.75 | 0.75 |
| Zinc oxide | 1 | 1 | 1 |
| Stearylamine | 1 | 1 | 1 |
| Difference δ G' (G'(1%) − G'(100%)) | 652 | 609 | 152 |

TABLE 4

| | Example 6 | Example 7 | Comparative Example 1 |
|---|---|---|---|
| Press-cross-linking conditions | 170° C. 30 min. | 170° C. 30 min. | 170° C. 30 min. |
| Mechanical properties of cross-linked product | | | |
| Measurement temperature 25° C. | | | |
| Tensile strength at break (MPa) | 19.6 | 21.6 | 10.5 |
| Tensile elongation at break (%) | 688 | 348 | 540 |
| Tear strength (kN/m) | 39.0 | 34.4 | 20.6 |
| Measurement temperature 160° C. | | | |
| Tensile strength at break (MPa) | 3.8 | 4.6 | 1.3 |
| Tensile elongation at break (%) | 404 | 190 | 57 |
| Tear strength (kN/m) | 14.8 | 13.2 | 5.4 |
| Measurement temperature 200° C. | | | |
| Tensile strength at break (MPa) | 3.2 | 3.8 | 1.0 |
| Tensile elongation at break (%) | 343 | 166 | 45 |
| Tear strength (kN/m) | 12.7 | 11.4 | 4.6 |
| Measurement temperature 230° C. | | | |
| Tensile strength at break (MPa) | 2.5 | 2.9 | 0.9 |
| Tensile elongation at break (%) | 263 | 118 | 32 |
| Dynamic viscoelasticity test (160° C.) | | | |
| Storage modulus E' (kPa) | 6084 | 9156 | 3169 |
| Loss modulus E" (kPa) | 1492 | 1676 | 381 |
| Evaluation of bellows-structured formed product | | | |
| Fraction defective (%) | 0 | 0 | 100 |

REFERENCE SIGNS LIST

1: formed product
12, 22: projection
21: primer valve
22: discharge side (engine side) hose
23: inhalation side (fuel tank side) hose
H1: Height of projection of formed product
W1: Width of projection of formed product

The invention claimed is:

1. A complex-shaped fluororubber formed product comprising:
   a cross-linked fluororubber layer obtainable by cross-linking a fluororubber composition containing a fluororubber (A) and a carbon black (B),
   the cross-linked fluororubber layer having a loss modulus E" of 400 kPa or higher and 6,000 kPa or lower determined by a dynamic viscoelasticity test under conditions of measurement temperature: 160° C., tensile strain: 1%, initial force: 157 cN, and frequency: 10 Hz,
   wherein the carbon black (B) is a carbon black having a nitrogen adsorption specific surface area ($N_2SA$) of 10 $m^2/g$ or larger.

2. The complex-shaped fluororubber formed product according to claim 1,
   wherein the cross-linked fluororubber layer has a storage modulus E' of 1,500 kPa or higher and 20,000 kPa or lower determined by a dynamic viscoelasticity test under conditions of measurement temperature: 160° C., tensile strain: 1%, initial force: 157 cN, and frequency: 10 Hz.

3. The complex-shaped fluororubber formed product according to claim 1,
   wherein the fluororubber composition contains 5 to 50 parts by mass of the carbon black (B) to 100 parts by mass of the fluororubber (A).

4. The complex-shaped fluororubber formed product according to claim 1,
   wherein the carbon black (B) is a carbon black having a nitrogen adsorption specific surface area ($N_2SA$) of 10 to 180 $m^2/g$ and a dibutyl phthalate (DBP) oil absorption of 40 to 180 ml/100 g.

5. The complex-shaped fluororubber formed product according to claim 1,
   wherein the fluororubber (A) is a vinylidene fluoride copolymerized rubber, a tetrafluoroethylene/perfluoro(alkyl vinyl ether) copolymerized rubber, or a tetrafluoroethylene/propylene copolymerized rubber.

6. The complex-shaped fluororubber formed product according to claim 1,
   wherein the fluororubber composition further contains a cross-linking agent (C) and/or a cross-linking aid (D).

7. The complex-shaped fluororubber formed product according to claim 1,
   wherein the cross-linked fluororubber layer has an elongation at break at 160° C. of 140 to 700%.

8. The complex-shaped fluororubber formed product according to claim 1,
   wherein the cross-linked fluororubber layer has a tensile strength at break at 160° C. of 3 to 20 MPa.

9. The complex-shaped fluororubber formed product according to claim 1,
   wherein the cross-linked fluororubber layer has a tear strength at 160° C. of 3 to 30 kN/m.

10. The complex-shaped fluororubber formed product according to claim 1,
    wherein the cross-linked fluororubber layer has an elongation at break at 200° C. of 110 to 700%.

11. The complex-shaped fluororubber formed product according to claim 1,
    wherein the cross-linked fluororubber layer has a tensile strength at break at 200° C. of 2 to 20 MPa.

12. The complex-shaped fluororubber formed product according to claim 1,
    wherein the cross-linked fluororubber layer has a tear strength at 200° C. of 3 to 30 kN/m.

13. The complex-shaped fluororubber formed product according to claim 1, which is a bellows-structured formed product.

14. The complex-shaped fluororubber formed product according to claim 1, which serves as a joint member.

15. The complex-shaped fluororubber formed product according to claim 1, which serves as a boot.

16. The complex-shaped fluororubber formed product according to claim 1, which serves as a grommet.

17. The complex-shaped fluororubber formed product according to claim 1, which serves as a primer valve.

* * * * *